(12) United States Patent
Marlow

(10) Patent No.: US 12,056,965 B1
(45) Date of Patent: Aug. 6, 2024

(54) VEHICLE DIAGNOSTIC PLATFORM USING AUGMENTED REALITY FOR DAMAGE ASSESSMENT

(71) Applicant: Allstate Insurance Company, Northbrook, IL (US)

(72) Inventor: Clint J. Marlow, Barrington Hills, IL (US)

(73) Assignee: Allstate Insurance Company, Northbrook, IL (US)

( * ) Notice: Subject to any disclaimer, the term of this patent is extended or adjusted under 35 U.S.C. 154(b) by 595 days.

(21) Appl. No.: 16/887,025

(22) Filed: May 29, 2020

(51) Int. Cl.
| | |
|---|---|
| G07C 5/08 | (2006.01) |
| G06F 18/214 | (2023.01) |
| G06N 20/00 | (2019.01) |
| G06T 11/00 | (2006.01) |
| G06V 10/143 | (2022.01) |
| G06V 20/56 | (2022.01) |

(52) U.S. Cl.
CPC ......... G07C 5/0808 (2013.01); G06F 18/214 (2023.01); G06N 20/00 (2019.01); G06T 11/00 (2013.01); G06V 10/143 (2022.01); G06V 20/56 (2022.01); *G06V 2201/08* (2022.01)

(58) Field of Classification Search
CPC .... G07C 5/0808; G06N 20/00; G06V 10/143; G06V 20/56; G06K 9/6256; G06T 11/00
See application file for complete search history.

(56) References Cited

U.S. PATENT DOCUMENTS

| | | |
|---|---|---|
| 9,235,378 B2 | 1/2016 | Soles et al. |
| 9,251,721 B2 | 2/2016 | Lampotang et al. |
| (Continued) | | |

FOREIGN PATENT DOCUMENTS

| | | |
|---|---|---|
| CN | 109389169 A | 2/2019 |
| KR | 20150046693 A | 4/2015 |
| WO | 2019157288 A1 | 8/2019 |

OTHER PUBLICATIONS

"Claim Genius's patent pending AI technology provides the industry's fastest and most accurate damage frame works . . . " Claim Genius website: https://claimgenius.com/technology/ website visited May 29, 2020, pp. 1-8.

(Continued)

*Primary Examiner* — Mishawn N. Hunter
(74) *Attorney, Agent, or Firm* — Akerman LLP

(57) ABSTRACT

Aspects of the disclosure relate to computing platforms that apply augmented reality techniques for vehicle diagnostics. A computing platform may receive images of a vehicle. By applying image recognition and machine learning algorithms to the images of the vehicle, the computing platform may identify the vehicle. The computing platform may identify schematics corresponding to the vehicle. Using the schematics, the computing platform may generate x-ray image information corresponding to the vehicle. The computing platform may send the images, the x-ray image information, and commands directing an enterprise user device to display an x-ray image, which may cause the enterprise user device to: modify the images of the vehicle based on the x-ray image information, and display an x-ray vehicle interface depicting a portion of the vehicle that: is not visible in the images, but would be visible if an exterior portion of the vehicle was displaced.

20 Claims, 15 Drawing Sheets

(56) References Cited

U.S. PATENT DOCUMENTS

| | | |
|---|---|---|
| 9,444,924 B2 | 9/2016 | Rodriguez et al. |
| 9,491,355 B2 | 11/2016 | Lowell |
| 9,646,431 B2 | 5/2017 | Schwartz et al. |
| 9,754,419 B2 | 9/2017 | Petrovskaya et al. |
| 9,761,055 B2 | 9/2017 | Miller |
| 9,978,105 B1 | 5/2018 | Parchment et al. |
| 10,032,225 B1 | 7/2018 | Fox et al. |
| 10,296,977 B2 | 5/2019 | Chevrette |
| 10,304,137 B1 | 5/2019 | Genser et al. |
| 10,410,182 B1 | 9/2019 | Tang et al. |
| 2006/0114531 A1* | 6/2006 | Webb ................ G01N 21/8851 359/15 |
| 2013/0317863 A1 | 11/2013 | Tofte et al. |
| 2016/0140778 A1 | 5/2016 | Bailly et al. |
| 2017/0147991 A1 | 5/2017 | Franke et al. |
| 2017/0293894 A1 | 10/2017 | Taliwal et al. |
| 2019/0096135 A1 | 3/2019 | Dal Mutto et al. |
| 2020/0184724 A1* | 6/2020 | Schell ................ G06F 18/22 |
| 2021/0287459 A1* | 9/2021 | Cella ................ G07C 5/0808 |
| 2022/0036463 A1* | 2/2022 | Faga ................ G06Q 10/10 |

OTHER PUBLICATIONS

"Repair Process" Crown Collision Center website: https://www.crownbodyshop.com/Repair-Process.html website visited May 29, 2020, pp. 1-3.

"Employ ML to Empower Your Business" Altoros website: https://www.altoros.com/solutions/car-damage-recognition website: visited May 29, 2020, pp. 1-4.

"AI takes the pain out of car insurance in India" Microsoft website: https://news.microsoft.com/en-in/features/icici-lombard-ai-enabled-car-inspection-app-india/ websited visited May 29, 2020, pp. 1-6.

\* cited by examiner

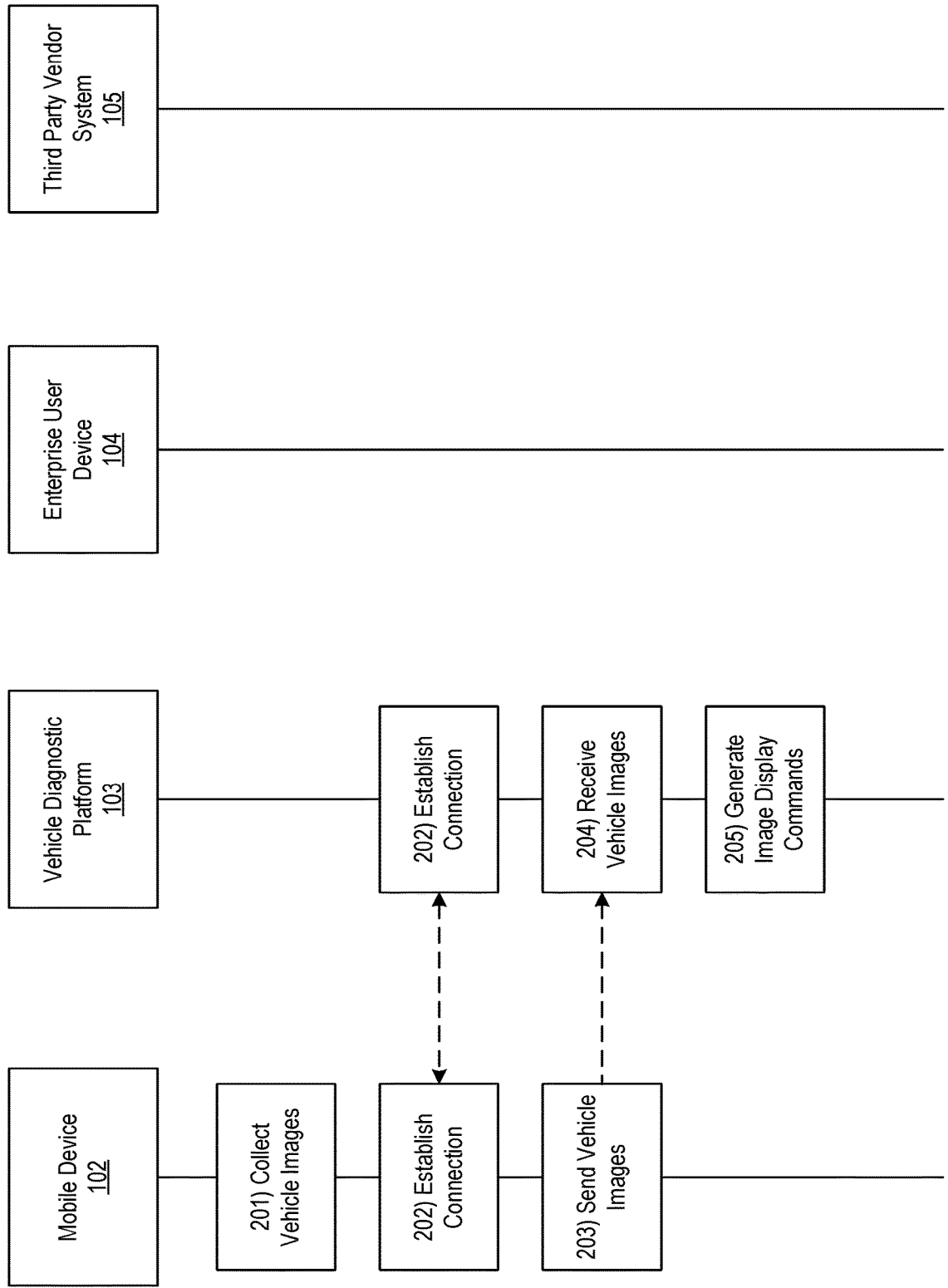

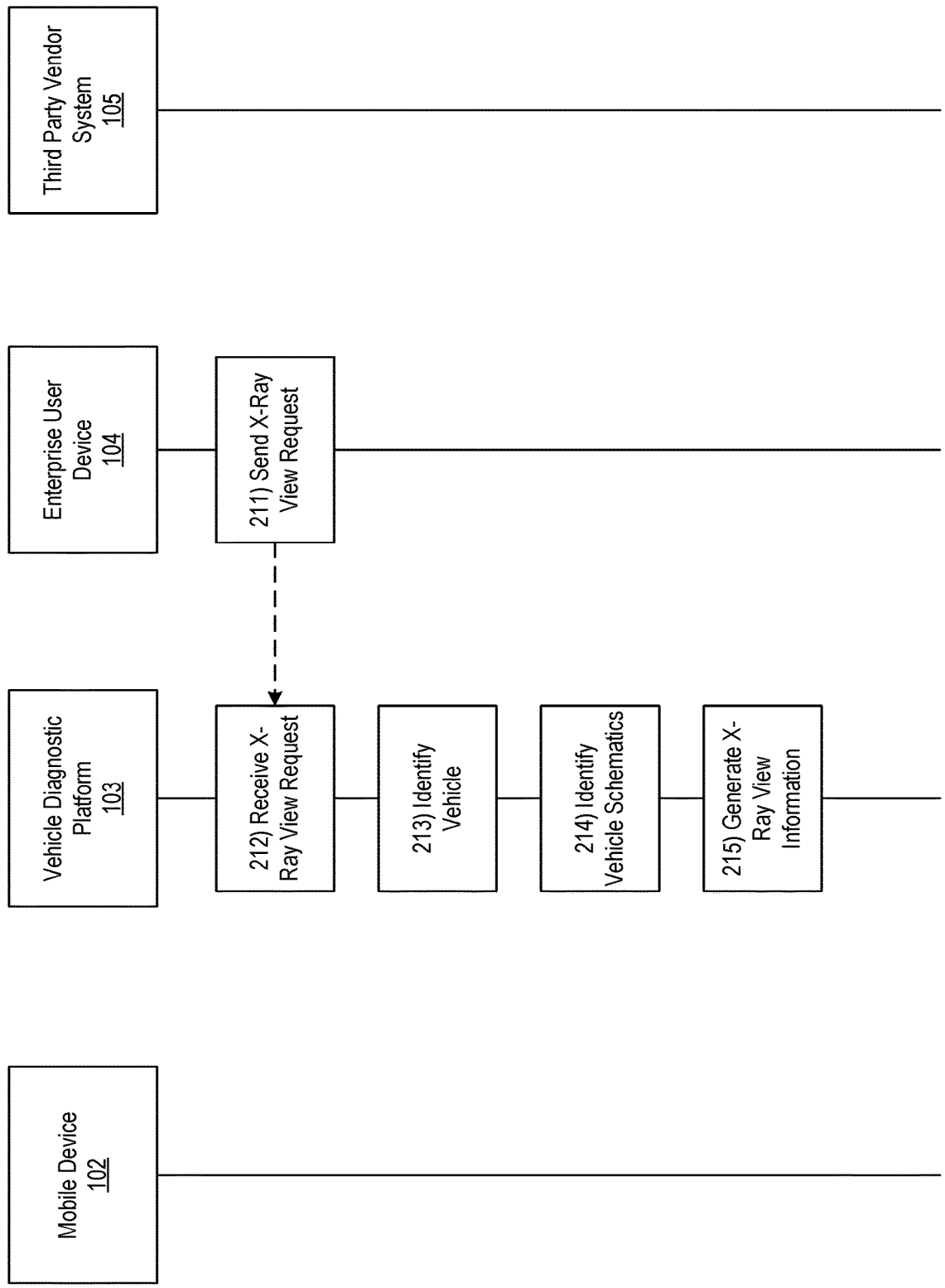

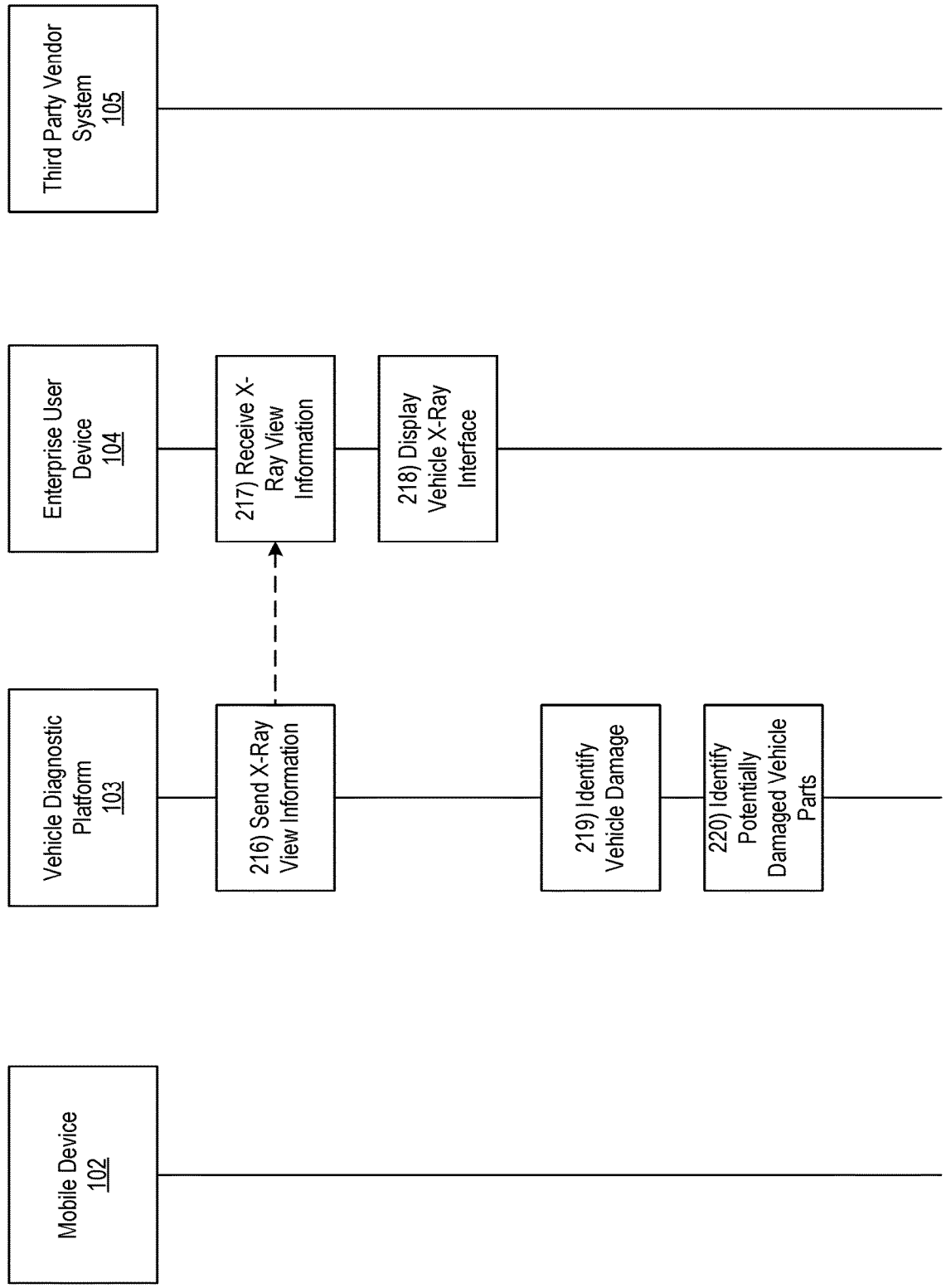

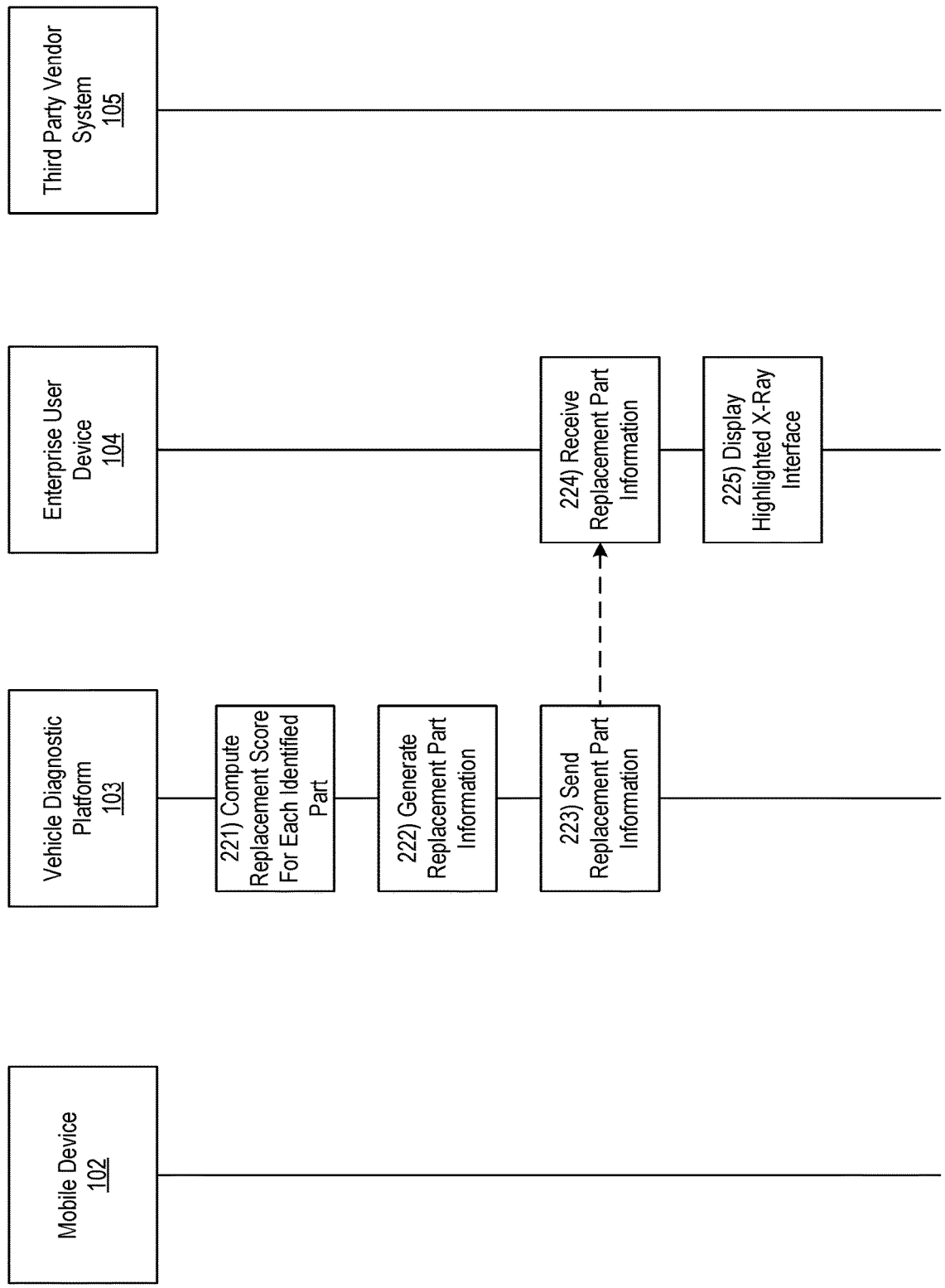

VEHICLE DIAGNOSTIC PLATFORM USING AUGMENTED REALITY FOR DAMAGE ASSESSMENT

BACKGROUND

Aspects of the disclosure relate to enhanced processing systems for executing machine learning, augmented reality, and image recognition techniques. Organizations and individuals may use images of a damaged vehicle to remotely assess damage to the vehicle. In many instances, however, such images may depict only a surface level of the vehicle. Accordingly, such images may result in unrealistic and/or inaccurate damage assessments. This may result in technical problems such as increased network bandwidth used in back and forth communications and increased processing power used to compute estimated repair costs that may be incorrect and/or undesired (e.g., by the driver). Furthermore, this may result in occurrence of live in person inspections, which may be costly and/or time consuming.

SUMMARY

Aspects of the disclosure provide effective, efficient, scalable, and convenient technical solutions that address and overcome the technical problems associated with diagnosing vehicle damage from a remote location. In accordance with one or more arrangements discussed herein, a computing platform having at least one processor, a communication interface, and memory may receive one or more images of a vehicle. By applying one or more image recognition and machine learning algorithms to the one or more images of the vehicle, the computing platform may identify the vehicle. The computing platform may identify one or more schematics corresponding to the identified vehicle. Using the one or more schematics, the computing platform may generate x-ray image information corresponding to the identified vehicle. The computing platform may send, to an enterprise user device, the one or more images, the x-ray image information corresponding to the identified vehicle, and one or more commands directing the enterprise user device to display an x-ray image of the vehicle, which may cause the enterprise user device to: 1) modify the one or more images of the vehicle based on the x-ray image information, and 2) display an x-ray vehicle interface, wherein the x-ray vehicle interface depicts a graphical representation of portion of the vehicle that: a) is not visible in the one or more images of the vehicle, and b) would be visible if an exterior portion of the vehicle was displaced.

In one or more instances, the computing platform may identify the vehicle by: 1) comparing image data of the one or more images of the vehicle to a machine learning dataset that includes additional image data for a plurality of additional images of a plurality of vehicles, 2) identifying, based on the comparison, a match between the image data and a subset of the additional image data, 3) accessing vehicle identification information corresponding to the subset of the additional image data, where the vehicle identification information is one or more of: a vehicle make, a vehicle model, a vehicle year, or a vehicle condition, and 4) using the vehicle identification information, the computing platform may identify an identity of the vehicle. In one or more instances, the computing platform may identify the one or more schematics corresponding to the identified vehicle by: a) accessing a stored dataset of correlations between vehicle identification information and schematics; and b) identifying, using the vehicle identification information, the one or more schematics corresponding to the identified vehicle, where each of the one or more schematics is associated with a portion of the identified vehicle.

In some examples, the computing platform may generate the x-ray image information by generating information that may be used to generate a graphical overlay on the one or more images, where the graphical overlay is one of the one or more schematics overlaid on a portion of the identified vehicle to which the one of the one or more schematics corresponds. In some arrangements, the computing platform may determine, using one or more image recognition and machine learning algorithms, damage to the identified vehicle, and may determine the damage to the identified vehicle by: 1) comparing the image data of the one or more images of the identified vehicle to the subset of the additional image data, 2) identifying, based on the comparison, a match between the image data and a second subset of the additional image data, 3) accessing damage information corresponding to the second subset of the additional image data, where the damage information includes details corresponding to damage of vehicles corresponding to the second subset of the additional image data, and 4) identifying, using the damage information, damage to the identified vehicle, which may include at least identifying a location of the damage to the identified vehicle.

In some example arrangements, the computing platform may identify, using the one or more schematics and the location of the damage to the identified vehicle, one or more vehicle components that are within a predetermined distance of the identified damage. For each of the one or more vehicle components that are within the predetermined distance of the identified damage and using one or more additional machine learning algorithms, the computing platform may compute a likelihood of replacement score. In one or more instances, the computing platform may compute the likelihood of replacement score by: 1) accessing a stored database that includes correlations between the second subset of the additional image data and, for each vehicle corresponding to the second subset of the additional image data, an indication of vehicle components that were replaced in repairing the corresponding vehicle, 2) computing, using the indications of vehicle components that were replaced in repairing the corresponding vehicles and for each of the one or more vehicle components that are within the predetermined distance of the identified damage, a likelihood of replacement score for each vehicle component identified in the stored database, and 3) comparing the likelihood of replacement score for each vehicle component identified in the stored database to a predetermined replacement threshold.

In one or more instances, in response to determining that the likelihood of replacement score for a first vehicle component of the one or more vehicle components that are within the predetermined distance of the identified damage exceeds the predetermined replacement threshold, generate one or more commands directing a third party vendor system to provide a replacement for the first vehicle component. The computing platform may send, to the third party vendor system, the one or more commands directing the third party vendor system to provide the replacement for the first vehicle component, which may cause the third party vendor system to cause shipment of the replacement for the first vehicle component to an enterprise organization corresponding to the enterprise user device.

In one or more instances, in response to determining that the likelihood of replacement score for a second vehicle component of the one or more vehicle components that are within the predetermined distance of the identified damage does not exceed the predetermined replacement threshold, the computing platform may send one or more commands, to a mobile device, directing the mobile device to display a prompt for client authorization. The computing platform may receive a message, from the mobile device, providing authorization to order a replacement for the second vehicle component. The computing platform may send, to the third party vendor system, one or more commands directing the third party vendor system to provide the replacement for the second vehicle component, wherein sending the one or more commands directing the third party vendor system to provide the replacement for the second vehicle component causes the third party vendor system to cause shipment of the replacement for the second vehicle component to the enterprise organization corresponding to the enterprise user device.

In one or more instances, based on the likelihood of replacement scores for each of the one or more vehicle components, the computing platform may generate replacement part information. The computing platform may generate one or more commands directing the enterprise user device to display a highlighted x-ray interface. The computing platform may send, to the enterprise user device, the one or more commands directing the enterprise user device to display the highlighted x-ray interface, which may cause the enterprise user device to: 1) generate, using the replacement part information, a highlight overlay for the x-ray vehicle interface that emphasizes, using a particular color, the one or more vehicle components that are within the predetermined distance of the identified damage, and 2) display, along with the x-ray vehicle interface, the highlight overlay.

In one or more instances, the computing platform may access the stored database, which may include correlations between the second subset of the additional image data and repair costs for each vehicle corresponding to the second subset of the additional image data. By averaging the repair costs for each vehicle corresponding to the second subset of the additional image data, the computing platform may compute a predicted repair cost for the identified vehicle. The computing platform may compare the predicted repair cost to a predetermined repair cost threshold.

In one or more instances, in response to determining that the predicted repair cost does not exceed the predetermined repair cost threshold, the computing platform may cause dispatch of a tow vehicle to a location of the identified vehicle, and the tow vehicle may be dispatched to the location of the identified vehicle without further authorization provided from a mobile device. In one or more instances, the computing platform may cause dispatch of the tow vehicle by: 1) generating one or more commands directing an autonomous vehicle control system corresponding to the tow vehicle to cause the tow vehicle to drive in an autonomous manner to the location of the identified vehicle, and 2) sending, to the autonomous vehicle control system, the one or more commands directing the autonomous vehicle control system corresponding to the tow vehicle to cause the tow vehicle to drive in an autonomous manner to the location of the identified vehicle, which may cause the tow vehicle to drive in an autonomous manner to the location of the identified vehicle.

In one or more examples, in response to determining that the predicted repair cost exceeds the predetermined repair cost threshold, the computing platform may send one or more commands, to a mobile device, directing the mobile device to display a prompt for client authorization. The computing platform may receive a message, from the mobile device, providing authorization to initiate repair of the identified vehicle, and may cause dispatch of a tow vehicle to a location of the identified vehicle.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for applying improved augmented reality, image recognition, and machine learning techniques to perform improved vehicle diagnostics in accordance with one or more example arrangements discussed herein;

DETAILED DESCRIPTION

Figure 1A:
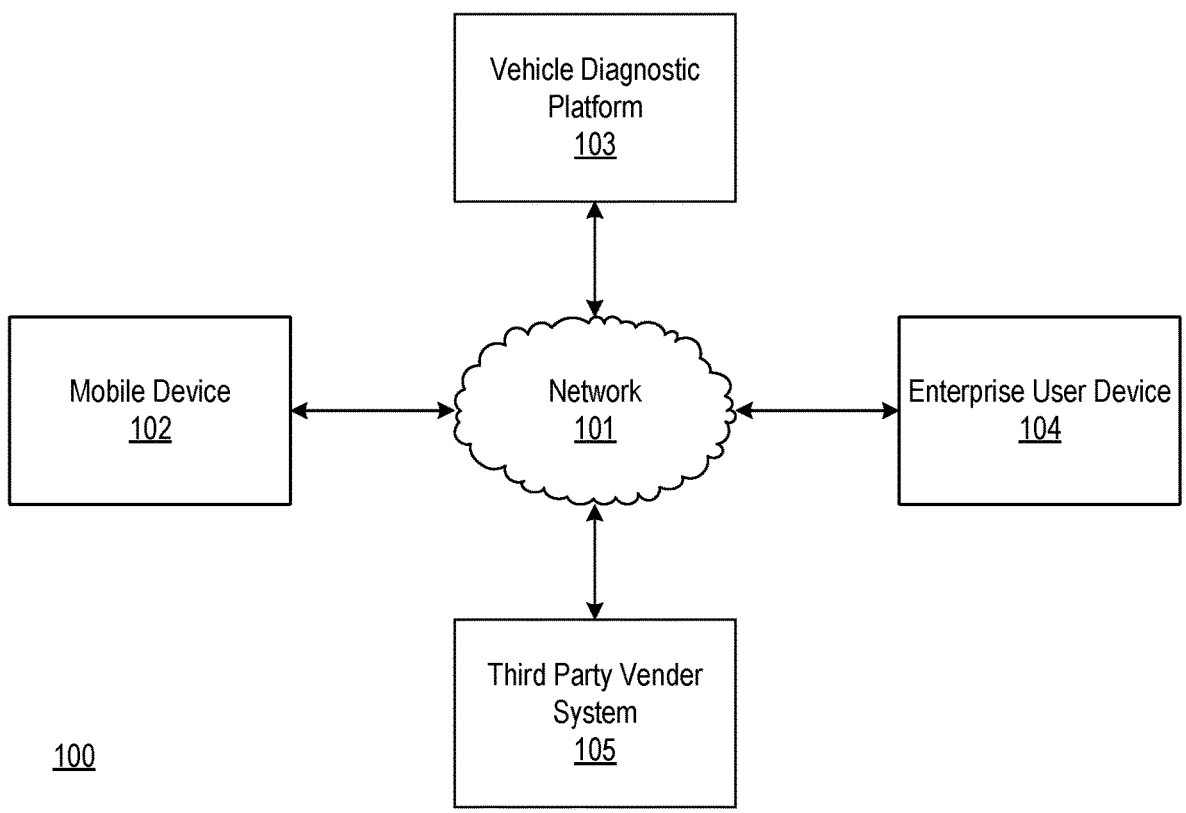
FIGS. 1A-1B depict an illustrative computing environment for applying improved augmented reality, image recognition, and machine learning techniques to perform improved vehicle diagnostics in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the present disclosure provides systems and methods for leveraging augmented reality, image recognition, and machine learning techniques to provide automated and/or enhanced diagnosis of vehicle damage. In short, using images and data collected from a variety of sources, as well as augmented reality technology, an original make-up of a vehicle may be overlaid on images provided by a customer. This may effectively allow a user (e.g., such as an employee of an insurance company, repair service, or the like) to see through the exterior of the vehicle. Accordingly, parts that might not readily be seen may be displayed using augmented reality. The composition and the exact location of the parts may be displayed. In some instances, the likelihood of the parts being damaged based on a variety of data points may help the user identify damage during an initial damage assessment.

In doing so, one or more of the systems and methods described herein may improve quality of remote damage assessments. For example, by performing the one or more methods described herein, diagnostic capabilities may be enhanced by enabling users and/or systems to perform a more detailed damage assessment than if merely an exterior view of the vehicle were to be shared (e.g., as in a standard virtual assistance application). Furthermore, network congestion may be reduced by eliminating back and forth communications between clients (e.g., drivers) and employees (e.g., mechanics, or the like). Rather, one or more of the systems and methods described herein may allow an employee to diagnose damage to a vehicle as if he or she is actually present at the vehicle. As yet another technical advantage, one or more of the systems and methods described herein may allow a system and/or employee to diagnose vehicle components that likely need to be replaced, and pre-order these vehicle components before the vehicle even arrives for repair. This may reduce time delays corresponding to a repair (and enhance automated diagnosis/repair procedures). As yet another technical advantage, one or more of the systems and methods described herein may enable users to access an x-ray view of a vehicle using only a mobile device (e.g., mobile phone, tablet, or the like) instead of augmented reality glasses (e.g., which may be costly and/or not readily available to users at all times).

Throughout the following description, various x-ray images and interfaces are described. It should be understood that the term x-ray is used for illustrative purposes, and does not necessarily refer to the use of actual x-ray data. Rather, the use of x-ray refers herein to augmented reality views (e.g., of vehicles, structures, or the like) that depict graphical representations of components (e.g., vehicle components, or the like) that are is not visible in an original image but that would be visible if an exterior portion (e.g., of a vehicle) was displaced.

Figure 1B:
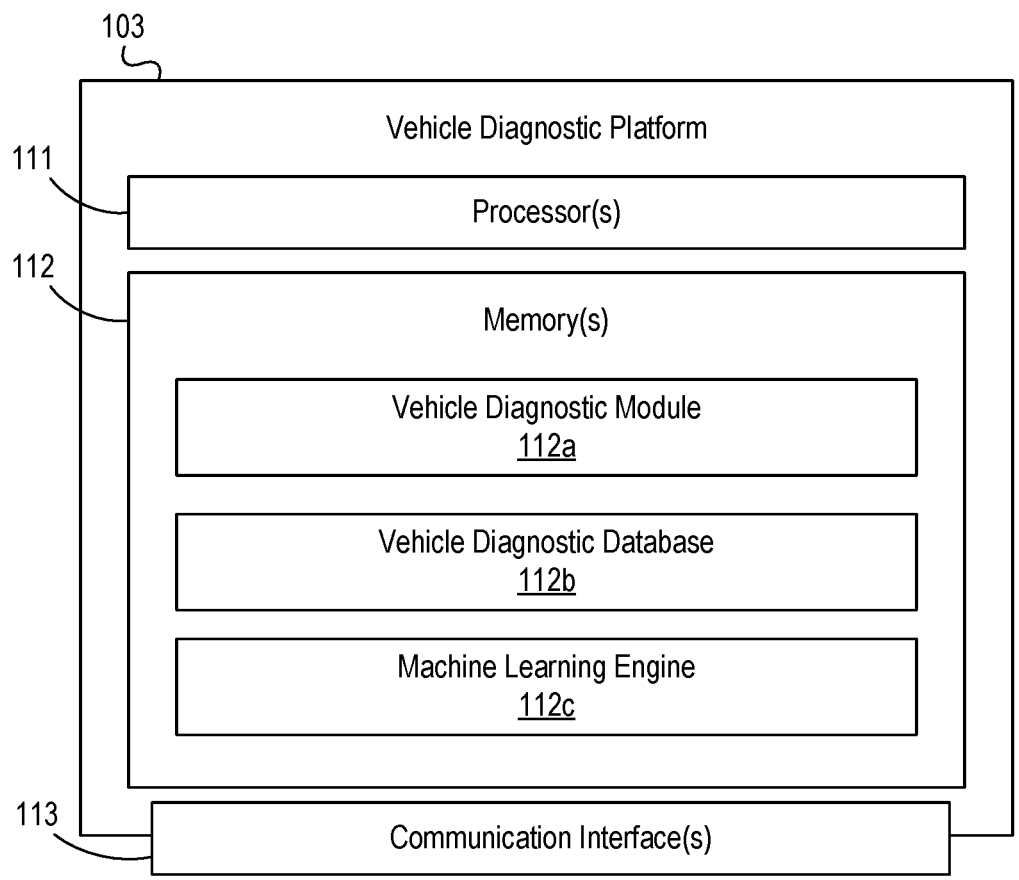

FIGS. 1A and 1B depict an illustrative computing environment for applying improved augmented reality, image recognition, and machine learning techniques to perform improved vehicle diagnostics in accordance with one or more example embodiments. Referring to FIG. 1A, computing environment 100 may include one or more computer systems. For example, computing environment 100 may include mobile device 102, vehicle diagnostic platform 103, enterprise user device 104, and third party vendor system 105.

Mobile device 102 may be a computing device (e.g., a smart phone, a tablet, or the like) that may be used (e.g., by a customer of an enterprise organization such as an insurance company) to collect image data (e.g., images, video, or the like). In some instances, mobile device 102 may be configured to communicate via a streaming video or other wireless data connection with vehicle diagnostic platform 103, enterprise user device 104, or the like. It should be understood that mobile device 102 is not necessarily usable exclusively by a customer of an insurance company. Rather, mobile device 102 may be a user device configured for use by a variety of users. In one or more instances, the mobile device 102 may be a computing device configured to receive information (e.g., from the vehicle diagnostic platform 103, enterprise user device 104, or the like) and to generate/display graphical user interfaces (e.g., authorization prompts, or the like) accordingly.

As illustrated in greater detail below, vehicle diagnostic platform 103 may include one or more computing devices configured to perform one or more of the functions described herein. For example, vehicle diagnostic platform 103 may include one or more computers (e.g., laptop computers, desktop computers, servers, server blades, or the like). In one or more instances, vehicle diagnostic platform 103 may be configured to maintain one or more machine learning models and/or to perform augmented reality, image recognition, and/or machine learning techniques to analyze image data received from mobile devices (e.g., mobile device 102, or the like) to evaluate damage and to generate modified user interfaces depicting x-ray views corresponding to the damage. In some instances, the vehicle diagnostic platform 103 may be configured to dynamically tune the machine learning models and/or algorithms based on received feedback and/or as additional data is received from the mobile devices. In one or more instances, the vehicle diagnostic platform 103 may be maintained by an enterprise organization (e.g., an insurance agency, vehicle repair service, or the like). It should be understood that although the name of vehicle diagnostic platform 103 and a majority of the description herein refer to diagnosis of damage to a vehicle, vehicle diagnostic platform 103 may be a diagnostic platform configured to assess damage in other use cases (e.g., such as damage to a home, office, infrastructure, or the like).

Enterprise user device 104 may be one or more computing devices (e.g., laptop computers, desktop computers, servers, server blades, or the like) that may be used (e.g., by an employee of an organization such as an insurance company, vehicle repair service, or the like) to perform damage assessments. In one or more instances, the enterprise user device 104 may be a computing device configured to receive information (e.g., from the mobile device 102, vehicle diagnostic platform 103, third party vendor system 105, or the like) and to generate/display graphical user interfaces (e.g., vehicle interfaces, x-ray interfaces, highlighted x-ray interfaces, or the like) accordingly. In some instances, enterprise user device 104 may be configured to establish a streaming video and/or other wireless data connection with the mobile device 102.

Third party vendor system 105 may be one or more computing systems (e.g., laptop computers, desktop computers, servers, server blades, or the like) configured to maintain an inventory system corresponding to the third party vendor and/or to facilitate order processing for the third party vendor. For example, the third party vendor system 105 may be configured to receive a request for a vehicle component from an enterprise organization (e.g., affiliated with enterprise user device 104, or the like) and process the request accordingly.

Computing environment 100 also may include one or more networks, which may interconnect one or more of mobile device 102, vehicle diagnostic platform 103, enterprise user device 104, third party vendor system 105, or the like. For example, computing environment 100 may include a network 101 (which may, e.g., interconnect mobile device 102, vehicle diagnostic platform 103, enterprise user device 104, third party vendor system 105, or the like).

In one or more arrangements, mobile device 102, vehicle diagnostic platform 103, enterprise user device 104, third party vendor system 105, and/or the other systems included in computing environment 100 may be any type of computing device capable of and configured for receiving a user interface, receiving input using the user interface, and communicating the received input to one or more other computing devices. For example, mobile device 102, vehicle diagnostic platform 103, enterprise user device 104, third party vendor system 105, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of mobile device 102, vehicle diagnostic platform 103, enterprise user device 104, and third party vendor system 105 may, in some instances, be special-purpose computing devices configured to perform specific functions.

Referring to FIG. 1B, vehicle diagnostic platform 103 may include one or more processors 111, memory 112, and communication interface 113. A data bus may interconnect processor 111, memory 112, and communication interface 113. Communication interface 113 may be a network interface configured to support communication between vehicle diagnostic platform 103 and one or more networks (e.g., network 101, or the like). Memory 112 may include one or more program modules having instructions that when executed by processor 111 cause vehicle diagnostic platform 103 to perform one or more functions described herein and/or one or more databases that may store and/or otherwise maintain information which may be used by such program modules and/or processor 111. In some instances, the one or more program modules and/or databases may be stored by and/or maintained in different memory units of vehicle diagnostic platform 103 and/or by different computing devices that may form and/or otherwise make up vehicle diagnostic platform 103. For example, memory 112 may have, store, and/or include vehicle diagnostic module 112a, a vehicle diagnostic database 112b, and a machine learning engine 112c. Vehicle diagnostic module 112a may have instructions that direct and/or cause vehicle diagnostic platform 103 to execute advanced augmented reality, image recognition, and/or machine learning techniques for damage assessment, as discussed in greater detail below. Vehicle diagnostic database 112b may store information used by vehicle diagnostic module 112a and/or vehicle diagnostic platform 103 in executing advanced augmented reality, image recognition, and/or machine learning techniques for damage assessment and/or in performing other functions. Machine learning engine 112c may have instructions that direct and/or cause the vehicle diagnostic platform 103 to execute advanced augmented reality, image recognition, and/or machine learning techniques for damage assessment, and to set, define, and/or iteratively refine optimization rules and/or other parameters used by the vehicle diagnostic platform 103 and/or other systems in computing environment 100.

Figure 2B:
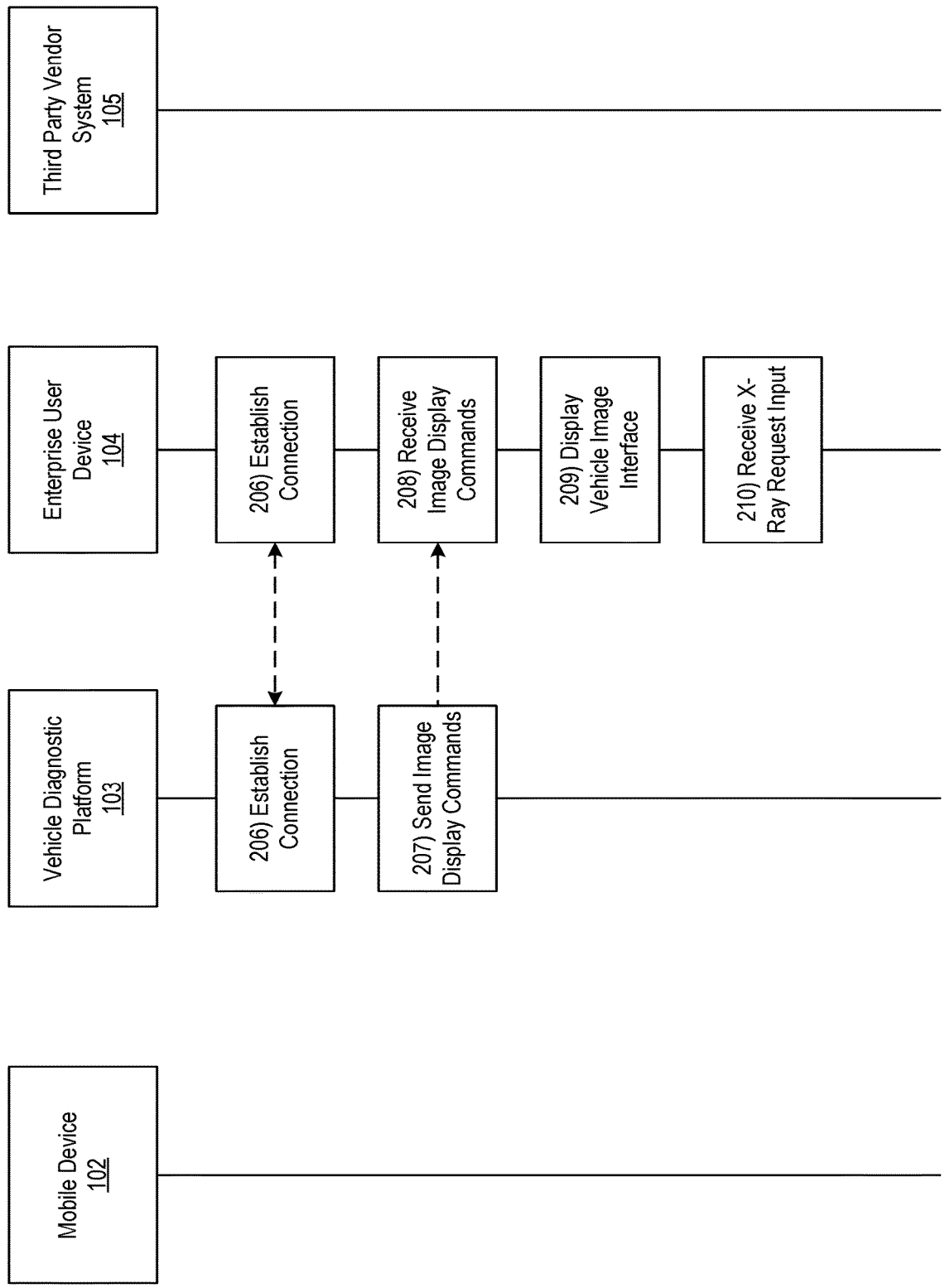

FIGS. 2A-2J depict an illustrative event sequence for applying improved augmented reality, image recognition, and machine learning techniques to perform improved vehicle diagnostics in accordance with one or more example embodiments. Referring to FIG. 2A, at step 201, the mobile device 102 may collect one or more images. For example, the mobile device 102 may be configured with one or more cameras, and may be configured to capture images and/or video (e.g., of a vehicle that has been damaged). In some instances, the mobile device 102 may collect the one or more images through a claim processing application, virtual assist application, or the like.

At step 202, the mobile device 102 may establish a connection with vehicle diagnostic platform 103. For example, the mobile device 102 may establish a first wireless data connection with the vehicle diagnostic platform 103 to link the mobile device 102 with the vehicle diagnostic platform 103. In some instances, the mobile device 102 may identify whether a connection is already established with the vehicle diagnostic platform 103. If a connection is already established with the vehicle diagnostic platform 103, the mobile device 102 might not re-establish the connection. If a connection is not already established with the vehicle diagnostic platform 103, the mobile device 102 may establish the first wireless data connection as described herein.

At step 203, the mobile device 102 may send the one or more vehicle images, collected at step 201, to the vehicle diagnostic platform 103. In one or more instances, the mobile device 102 may send the one or more vehicle images to the vehicle diagnostic platform 103 while the first wireless data connection is established. In some instances, in addition to or instead of sending the one or more images to the vehicle diagnostic platform 103, the mobile device may establish a real-time streaming video connection with the enterprise user device 104 (in some instances, the mobile device 102 may be routed to the enterprise user device 104 via the vehicle diagnostic platform 103), and may share live streaming video with the enterprise user device 104.

At step 204, the vehicle diagnostic platform 103 may receive the one or more images sent at step 203. In one or more instances, the vehicle diagnostic platform 103 may receive the one or more images via the communication interface 113 and while the first wireless data connection is established. In some instances, in addition to or instead of receiving the one or more vehicle images, the enterprise user device 104 may facilitate a streaming video connection with the enterprise user device 104 (in some instances, this may be a connection between the mobile device 102 and enterprise user device 104 that might not involve the vehicle diagnostic platform 103. At step 205, the vehicle diagnostic platform 103 may generate one or more commands directing the enterprise user device 104 to display a vehicle image interface, which may include the one or more images (and/or streaming video content).

Referring to FIG. 2B, at step 206, the vehicle diagnostic platform 103 may establish a connection with enterprise user device 104. In one or more instances, the vehicle diagnostic platform 103 may establish a second wireless data connection with the enterprise user device 104 to link the vehicle diagnostic platform 103 to the enterprise user device 104. In one or more instances, the vehicle diagnostic platform 103 may identify whether or not a connection is already established with the enterprise user device 104. If a connection is already established with the enterprise user device 104, the vehicle diagnostic platform 103 might not re-establish the connection. If a connection is not already established, however, the vehicle diagnostic platform 103 may establish the second wireless data connection as described herein.

At step 207, the vehicle diagnostic platform 103 may send the one or more commands directing the enterprise user device 104 to display the vehicle image interface. In one or more instances, the vehicle diagnostic platform 103 may send the one or more commands directing the enterprise user device 104 to display the vehicle image interface via the communication interface 113 and while the second wireless data connection is established. In some instances, the vehicle diagnostic platform 103 may additionally send image data corresponding to the one or more images. In some instances, the vehicle diagnostic platform 103 may generate the vehicle image interface, and may send the vehicle image interface.

At step 208, the enterprise user device 104 may receive the one or more commands directing the enterprise user device 104 to display the vehicle image interface. In one or more instances, the enterprise user device 104 may receive the one or more commands directing the enterprise user device 104 to display the vehicle image interface while the second wireless data connection is established. In some instances, the enterprise user device 104 may additionally receive image data corresponding to the one or more images.

In some instances, the enterprise user device 104 may receive the vehicle image interface.

Figure 4:
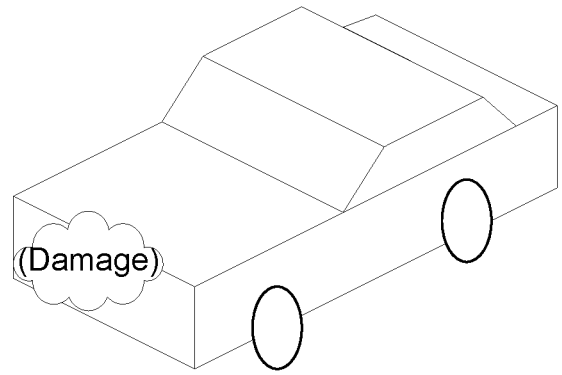
FIGS. 4-6 depict illustrative user interfaces for implementing applying improved augmented reality, image recognition, and machine learning techniques to perform improved vehicle diagnostics in accordance with one or more example arrangements discussed herein.

At step 209, the enterprise user device 104 may display the vehicle image interface. In some instances, the enterprise user device 104 may generate and/or display the vehicle image interface in response to the one or more commands directing the enterprise user device 104 to display the vehicle image interface. In one or more instances, in displaying the vehicle image interface, the enterprise user device 104 may display a graphical user interface similar to graphical user interface 405, which is shown in FIG. 4. For example, the enterprise user device 104 may display an image of the vehicle, which may, in some instances, be damaged. In some instances, in displaying the vehicle image interface, the enterprise user device 104 may display a live video feed depicting the vehicle.

At step 210, the enterprise user device 104 may receive an x-ray request input, requesting that an x-ray view of at least a portion of the vehicle be presented. In some instances, in receiving the x-ray request input, the enterprise user device 104 may receive a touch input, gesture input, selection input, or the like specifying a portion of the vehicle for which the x-ray view should be presented (e.g., under the hood, behind a light, side of the vehicle, or the like).

Referring to FIG. 2C, at step 211, the enterprise user device 104 may generate and send an x-ray view request to the vehicle diagnostic platform 103. In some instances, the enterprise user device 104 may generate the x-ray view request based on the x-ray view input. In some instances, the enterprise user device 104 may send the x-ray view request to the vehicle diagnostic platform 103 while the second wireless data connection is established.

At step 212, the vehicle diagnostic platform 103 may receive the x-ray view request sent at step 211. In one or more instances, the vehicle diagnostic platform 103 may receive the x-ray view request via the communication interface 113 and while the second wireless data connection is established.

At step 213, the vehicle diagnostic platform 103 may identify the vehicle. In some instances, the vehicle diagnostic platform 103 may apply one or more machine learning algorithms, image recognition algorithms, or the like to identify the vehicle. For example, the vehicle diagnostic platform 103 may access a dataset containing image data corresponding to a plurality of vehicles. In some instances, in accessing the dataset containing the image data corresponding to the plurality of vehicles, the vehicle diagnostic platform may access a labelled dataset, generated automatically, based on user input, or the like, that indicates a make, a model, a year, a condition, or the like corresponding to each vehicle in the image data. The vehicle diagnostic platform 103 may compare image data from the one or more images to the dataset, and may identify matches (exact or within a predetermined variation threshold) within the dataset. In these instances, the vehicle diagnostic platform 103 may identify, based on the matches and using the labelled dataset, an identity of the vehicle.

As an example, the vehicle diagnostic platform 103 may receive an image of a 2013 Volvo XC90 from the mobile device 102, but might not yet have identified that the vehicle is a 2013 Volvo XC90. The vehicle diagnostic platform 103 may compare the image to a plurality of stored images, and identify a best match image. The vehicle diagnostic platform 103 may also identify that the best match image is labelled as depicting a 2013 Volvo XC90. Accordingly, the vehicle diagnostic platform 103 may identify that the vehicle in the image is a 2013 Volvo XC90. In some instances, the vehicle diagnostic platform 103 may identify multiple matches, and may determine that 90% (or some other threshold identification percentage) of the matches are 2013 Volvo XC90s. In these instances, the vehicle diagnostic platform 103 may determine that the vehicle is a 2013 Volvo XC90.

At step 214, the vehicle diagnostic platform 103 may identify vehicle schematics corresponding to the vehicle identified at step 213. For example, the vehicle diagnostic platform 103 may access a machine learning model that includes vehicle schematics corresponding to each of the plurality of vehicles. For example, in accessing the machine learning model, the vehicle diagnostic platform 103 may access a stored dataset of correlations between vehicle identification information and schematics. Accordingly, the vehicle diagnostic platform 103 may access the machine learning model and identify, based on the vehicle identity from step 213, vehicle schematics corresponding to the vehicle. For example, the vehicle diagnostic platform 103 may identify schematics corresponding to the 2013 Volvo XC90 identified at step 213.

At step 215, the vehicle diagnostic platform 103 may generate x-ray view information using the identified vehicle schematics. In some instances, in generating the x-ray view information, the vehicle diagnostic platform 103 may generate information that may be used to generate an interface that includes a vehicle schematic, based on the identified vehicle schematics, which corresponds to the portion of the vehicle for which the x-ray view was requested at step 211. In some instances, in generating the x-ray view information, the vehicle diagnostic platform 103 may generate information that may be used to generate an interface that includes an x-ray view, based on the identified vehicle schematics and using one or more machine learning algorithms, that corresponds to a graphical representation the portion of the vehicle for which the x-ray view was requested. For example, rather than depicting a vehicle schematic, the actual x-ray view may depict a graphical representation of a subsurface portion of the vehicle, not visible in the one or more images, that would be visible if an exterior of the portion of the vehicle was displaced (e.g., if the hood was opened, a light was removed, a body panel was removed, or the like). In doing so, the vehicle diagnostic platform 103 may identify component numbers and a corresponding layout using the identified vehicle schematics. The vehicle diagnostic platform 103 may identify, using a stored database, images of vehicle components matching the identified component numbers (e.g., the vehicle diagnostic platform 103 might not receive actual x-ray data for the vehicle, but rather may identify the images of the vehicle components matching the identified component numbers so as to recreate an interface that resembles an x-ray view of the vehicle). For example, the vehicle diagnostic platform 103 may identify an image of an engine of the same model, brand, type, or the like as is integrated into the vehicle, and use this image (and others) to assemble what is effectively an x-ray view of the vehicle. In these instances, the vehicle diagnostic platform 103 may generate the x-ray vehicle interface and/or the x-ray view information using these images of the vehicle components and the corresponding layout. In doing so, the vehicle diagnostic platform 103 may create an augmented reality view of the vehicle, depicting a portion of the vehicle that is not visible in the one or more images of the vehicle and that would be visible if an exterior portion of the vehicle was displaced.

In some instances, the vehicle diagnostic platform 103 may generate one or more commands directing the enterprise user device 104 to generate and/or display an x-ray vehicle interface. In some instances, rather than generating the x-ray view information, the vehicle diagnostic platform 103 may generate the x-ray vehicle interface itself. In some instances, the x-ray vehicle interface may be a graphical overlay for the one or more vehicle images. In other instances, the vehicle diagnostic platform 103 may modify the one or more vehicle images, resulting in the x-ray vehicle interface.

Referring to FIG. 2D, at step 216, the vehicle diagnostic platform 103 may send the x-ray view information to the enterprise user device 104. In some instances, the vehicle diagnostic platform 103 may send the x-ray view information to the enterprise user device 104 via the communication interface 113 and while the second wireless data connection is established. In some instances, the vehicle diagnostic platform 103 may additionally send the one or more commands directing the vehicle diagnostic platform 103 to generate and/or display the x-ray vehicle interface. In some instances, the vehicle diagnostic platform 103 may send the x-ray vehicle interface itself.

At step 217, the enterprise user device 104 may receive the x-ray view information from the vehicle diagnostic platform 103. In some instances, the enterprise user device 104 may receive the x-ray view information from the vehicle diagnostic platform 103 while the second wireless data connection is established. In some instances, the enterprise user device 104 may additionally receive the one or more commands directing the enterprise user device 104 to generate and/or display the x-ray vehicle interface. In some instances, the enterprise user device 104 may receive the x-ray vehicle interface itself.

Figure 5:
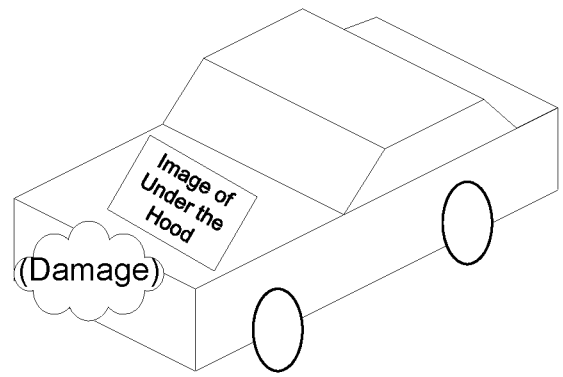

At step 218, the enterprise user device 104 may generate and/or display the vehicle x-ray interface. In some instances, in displaying the vehicle x-ray interface, the enterprise user device 104 may display an interface that includes the vehicle from the vehicle image interface, but that is modified to include schematics, hidden vehicle components (e.g., a graphical depiction of the component images rather than merely the schematics, diagrams, or the like), or the like. For example, the enterprise user device 104 may display an interface that depicts a graphical representation of an engine, radiator, battery, or the like within the vehicle (which may, e.g., be an image of an engine rather than a schematic of the engine, or the like). For example, in displaying the vehicle x-ray interface, the enterprise user device 104 may display an interface similar to graphical user interface 505, which is shown in FIG. 5. In doing so, the enterprise user device 104 may display an augmented reality view of the identified vehicle, depicting a portion of the vehicle that is not visible in the one or more images of the vehicle and that would be visible if an exterior portion of the vehicle was displaced.

To continue with the example described above, the vehicle in the vehicle image interface may have been identified as a 2013 Volvo XC90. The enterprise user device 104 may have received a user input requesting that an x-ray vehicle interface be generated with regard to the hood of the vehicle (e.g., because the front of the vehicle appears to be damaged). Accordingly, in displaying the x-ray vehicle interface in this case, the enterprise user device 104 may display a graphical representation of a view of under the hood of the 2013 Volvo XC90, along with the remainder of the vehicle (e.g., an exterior, surface level view). For example, the enterprise user device 104 may display images of one or more vehicle components themselves (e.g., an engine, radiator, battery, or the like). In these instances, the enterprise user device 104 might not display that exact vehicle components from the vehicle (e.g., actual x-ray information might not be collected), but rather, the enterprise user device 104 may display a graphical representation of these same vehicle components (e.g., the exact radiator from the vehicle might not be displayed, but a radiator of the same type may be displayed). As such, the enterprise user device 104 may display a view of the vehicle in which the hood of the 2013 Volvo XC90 appears to have been raised or has disappeared.

At step 219, the vehicle diagnostic platform 103 may identify damage to the vehicle. In some instances, the vehicle diagnostic platform 103 may identify the damage to the vehicle by comparing image data of the one or more images to image data of the best match image, identified at step 213. In these instances, the vehicle diagnostic platform 103 may identify discrepancies between different image data (e.g., image data for a non-damaged depiction of the vehicle may vary from image data for a damaged depiction). Based on the identified discrepancies, the vehicle diagnostic platform 103 may identify a location of the damage. For example, the vehicle diagnostic platform 103 may compare the damaged image of the 2013 Volvo XC90 to an undamaged image of a 2013 Volvo XC90 and may identify, based on discrepancies between the images, that the front of the 2013 Volvo XC90 is damaged and a type of damage that occurred (e.g., broken headlight, broken window, fender bender, blown tire, or the like).

In some instances, in identifying the damage to the vehicle, the vehicle diagnostic platform 103 may compare the image data of the one or more images to the dataset containing image data corresponding to a plurality of vehicles (e.g., as described above at step 213). In doing so, the vehicle diagnostic platform 103 may identify a subset of the image data corresponding to the plurality of vehicles (e.g., image data that depicts similar damage), and may access, for each image corresponding to the subset, damage information indicating damage that occurred to the corresponding vehicle. Using this damage information, the vehicle diagnostic platform 103 may identify the damage to the vehicle.

At step 220, the vehicle diagnostic platform 103 may identify one or more potentially damaged vehicle components. For example, the vehicle diagnostic platform 103 may identify, based on the location of the damage identified at step 219 and the vehicle schematics identified at step 214, one or more vehicle components that are within a predetermined distance of the damage.

Referring to FIG. 2E, at step 221, the vehicle diagnostic platform 103 may compute, for each of the one or more potentially damaged vehicle components, a likelihood of replacement score. For example, by executing one or more machine learning algorithms and using one or more machine learning datasets, the vehicle diagnostic platform 103 may compute a score indicating a likelihood that each of the one or more potentially damaged vehicle components will need replacement (e.g., are damaged beyond repair). In some instances, the vehicle diagnostic platform 103 may identify a machine learning dataset based on the damage identified at step 219. For example, the vehicle diagnostic platform 103 may identify a dataset including replacement data for various vehicle components corresponding to damage (e.g., as identified in step 219) to vehicles of the same type as the identified vehicle (e.g., as identified in step 213). For example, the vehicle diagnostic platform 103 may identify a dataset including replacement data for vehicle components for a 2013 Volvo XC90 that experienced damage to the front of the vehicle. After identifying the one or more machine learning datasets, the vehicle diagnostic platform 103 may access these one or more machine learning datasets to identify, for each of the one or more potentially damaged vehicle components, a likelihood that each component will need replacement (e.g., based on corresponding historical circumstances). In some instances, the vehicle diagnostic platform 103 may compute the likelihood of replacement score using historical purchasing data. For example, if people purchase a second part 90% of the time they purchase a first part, it may mean that the two are typically replaced together, which may increase the likelihood replacement score for the second part if the first part likely will need replacement.

For example, the vehicle diagnostic platform 103 may compute a replacement score of 0.3 for an engine, 0.5 for a radiator, and 0.8 for a battery of the 2013 Volvo XC90. In some instances, these machine learning datasets may be maintained at the vehicle diagnostic platform 103. Additionally or alternatively, the vehicle diagnostic platform 103 may access these machine learning datasets by communicating with third party databases affiliated with a manufacturer, repair service, or the like.

At step 222, the vehicle diagnostic platform 103 may generate replacement part information. For example, for each of the one or more potentially damaged vehicle components, the vehicle diagnostic platform 103 may generate replacement part information that may be used by the enterprise user device 104 to generate a highlighted x-ray interface. In some instances, the vehicle diagnostic platform 103 may generate replacement part information for each of the one or more potentially damaged vehicle components. In other instances, the vehicle diagnostic platform 103 may compare the likelihood of replacement scores for each of the one or more potentially damaged vehicle components to a predetermined replacement threshold, and may generate replacement part information for vehicle components with replacement scores that exceed the predetermined replacement threshold. In some instances, along with the replacement part information, the vehicle diagnostic platform 103 may generate one or more commands directing the enterprise user device 104 to generate and/or display the highlighted x-ray interface using the replacement part information. In some instances, rather than sending replacement part information that may be used by the enterprise user device 104 to generate the highlighted x-ray interface, the vehicle diagnostic platform 103 may generate the highlighted x-ray interface itself. In some instances, in generating the highlighted x-ray interface, the vehicle diagnostic platform 103 and/or enterprise user device 104 may generate an overlay to be displayed along with the vehicle image interface and/or the x-ray vehicle interface (e.g., as displayed in FIGS. 4 and 5 respectively). In other instances, the vehicle diagnostic platform 103 and/or enterprise user device 104 may modify the vehicle image interface and/or the x-ray vehicle interface to generate the highlighted x-ray interface. In doing so, the vehicle diagnostic platform 103 may generate an augmented reality view of the vehicle.

At step 223, the vehicle diagnostic platform 103 may send the replacement part information to the enterprise user device 104. In some instances, the vehicle diagnostic platform 103 may also send the one or more commands directing the enterprise user device 104 to generate and/or display the highlighted x-ray interface using the replacement part information. In some instances, the vehicle diagnostic platform 103 may send the highlighted x-ray interface itself. In some instances, the vehicle diagnostic platform 103 may send the replacement part information to the enterprise user device 104 via the communication interface 113 and while the second wireless data connection is established.

At step 224, the enterprise user device 104 may receive the replacement part information sent at step 223. In some instances, the enterprise user device 104 may receive the one or more commands directing the enterprise user device 104 to generate and/or display the highlighted x-ray interface using the replacement part information. In some instances, the enterprise user device 104 may receive the highlighted x-ray interface itself. In some instances, the enterprise user device 104 may receive the replacement part information while the second wireless data connection is established.

Figure 6:
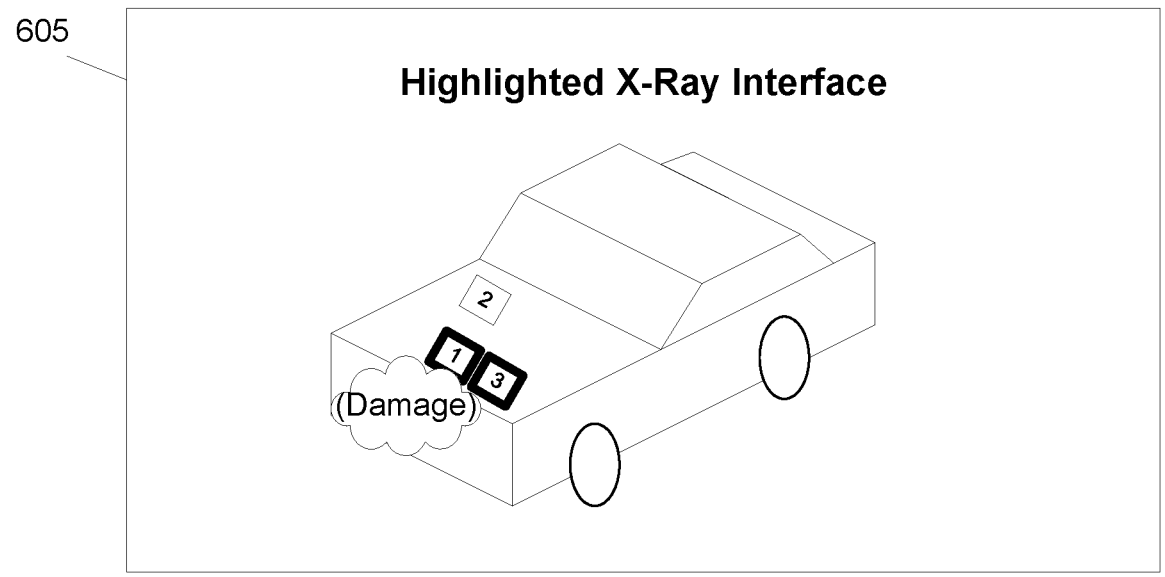

At step 225, the enterprise user device 104 may generate and/or display the highlighted x-ray interface. In some instances, the enterprise user device 104 may generate and/or display the highlighted x-ray interface in response to the one or more commands directing the enterprise user device 104 to generate and/or display the highlighted x-ray interface. In some instances, in displaying the highlighted x-ray interface, the enterprise user device 104 may display a graphical user interface similar to graphical user interface 605, which is shown in FIG. 6. For example, the enterprise user device 104 may display vehicle components (as previously displayed in the x-ray vehicle interface shown in FIG. 5), and may highlight all or a subset of the vehicle components (e.g., the one or more potentially damaged vehicle components, a subset of the one or more potentially damaged vehicle components with likelihood of replacement scores that exceed a predetermined replacement threshold, or the like). In doing so, the enterprise user device 104 may display an augmented reality view of the identified vehicle.

Figure 2F:
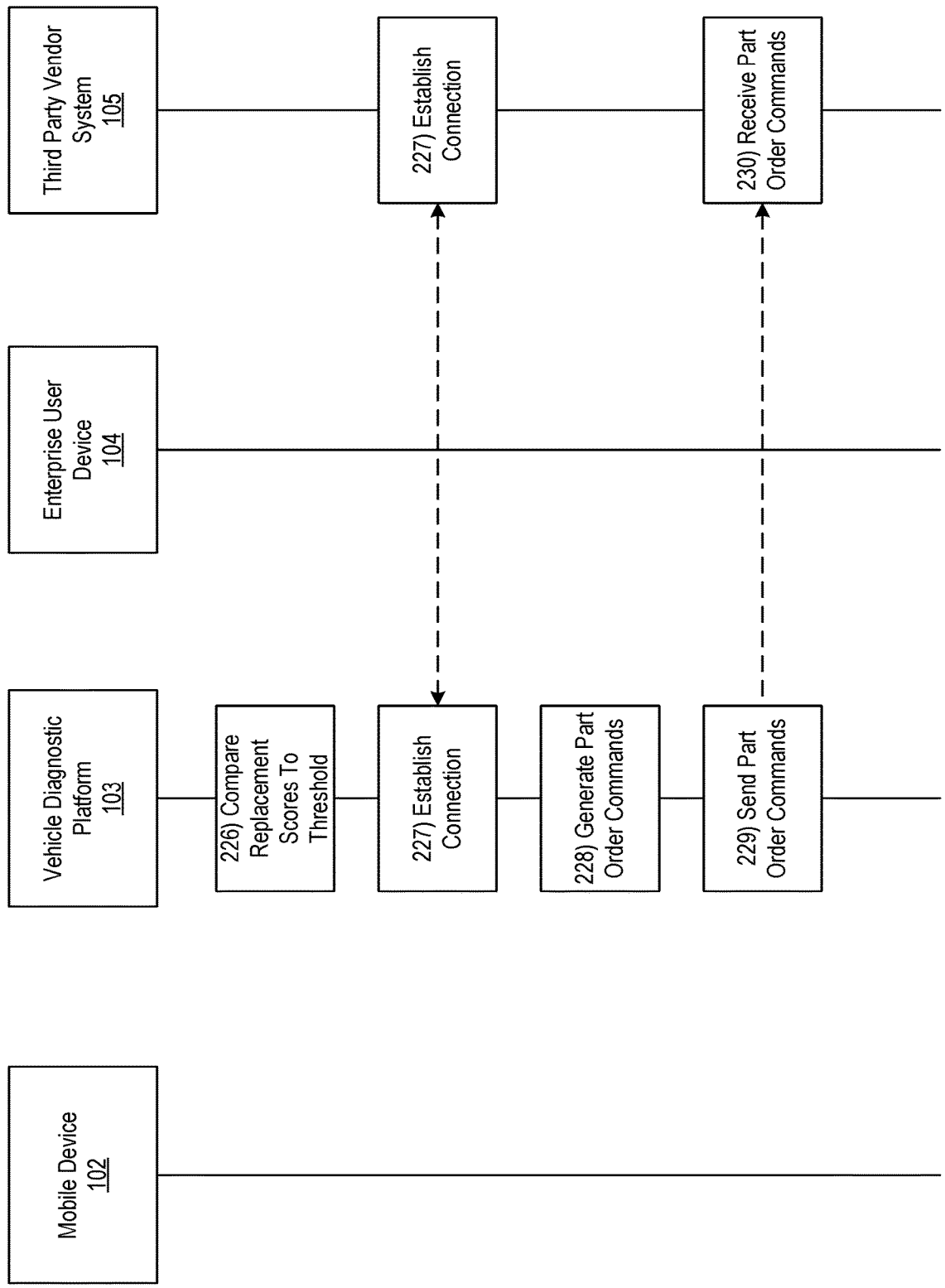

Referring to FIG. 2F, at step 226, the vehicle diagnostic platform 103 may compare the likelihood of replacement scores, computed at step 221, to a predetermined replacement threshold. It should be understood that in some instances, the vehicle diagnostic platform 103 may have previously compared the likelihood of replacement scores to the predetermined replacement threshold (e.g., to identify which vehicle components to highlight in the highlighted x-ray interface). In these instances, the vehicle diagnostic platform 103 might not repeat the comparison. In some instances, the vehicle diagnostic platform 103 may apply a first replacement threshold to identify vehicle components to be highlighted and a second replacement threshold to identify vehicle components for which replacements should be ordered. In some instances, the vehicle diagnostic platform 103 may apply different replacement thresholds to each of the likelihood of replacement scores (e.g., for each of the vehicle components). In some instances, the vehicle diagnostic platform 103 may dynamically tune the one or more predetermined replacement thresholds automatically (e.g., to maintain a predetermined percentage of components that exceed or fall short of the predetermined replacement threshold), based on user preferences (e.g., user provides input indicating that threshold should be increased), or the like.

For vehicle components corresponding to likelihood of replacement scores that exceed the predetermined replacement threshold, the vehicle diagnostic platform 103 may proceed to step 227. For vehicle components corresponding to likelihood of replacement scores that do not exceed the predetermined replacement threshold, the vehicle diagnostic platform 103 may proceed to step 232. As a particular example, the vehicle diagnostic platform 103 may maintain a predetermined replacement threshold of 0.6. Accordingly, referring to the illustrative likelihood of replacement scores (e.g., 0.3 for an engine, 0.5 for a radiator, and 0.8 for a battery of the 2013 Volvo XC90), the vehicle diagnostic platform 103 may proceed to step 227 with regard to the battery, and step 232 with regard to the engine and radiator.

At step 227, the vehicle diagnostic platform 103 may establish a connection with third party vendor system 105. In one or more instances, the vehicle diagnostic platform 103 may establish a third wireless data connection with the third party vendor system 105 to link the vehicle diagnostic platform 103 to the third party vendor system 105. In some instances, the vehicle diagnostic platform 103 may identify whether a connection was previously established with the third party vendor system 105. If a connection was previously established with the third party vendor system 105, the vehicle diagnostic platform 103 might not re-establish the connection. If a connection was not previously established with the third party vendor system 105, the vehicle diagnostic platform 103 may establish the third wireless data connection as described herein.

At step 228, the vehicle diagnostic platform 103 may generate one or more commands directing the third party vendor system 105 to initiate an order of vehicle components, identified at step 226, as having corresponding likelihood of replacement scores that exceed the predetermined replacement threshold. For example, the vehicle diagnostic platform 103 may generate one or more commands directing the third party vendor system 105 to initiate an order of a new battery for the vehicle. In some instances, the vehicle diagnostic platform 103 may include, along with the one or more commands, a vehicle component identifier (e.g., a serial number, make, or the like) based on the schematics to identify a specific component for the vehicle (e.g., the 2013 Volvo XC90).

At step 229, the vehicle diagnostic platform 103 may send the one or more commands directing the third party vendor system 105 to initiate an order of vehicle components. In some instances, the vehicle diagnostic platform 103 may send the one or more commands directing the third party vendor system 105 to initiate the order of vehicle components via the communication interface 113 and while the third wireless data connection is established.

At step 230, the third party vendor system 105 may receive the one or more commands directing the third party vendor system 105 to initiate the order of vehicle components. For example, the third party vendor system 105 may receive the one or more commands directing the third party vendor system 105 to initiate the order of vehicle components while the third wireless data connection is established.

Figure 2G:
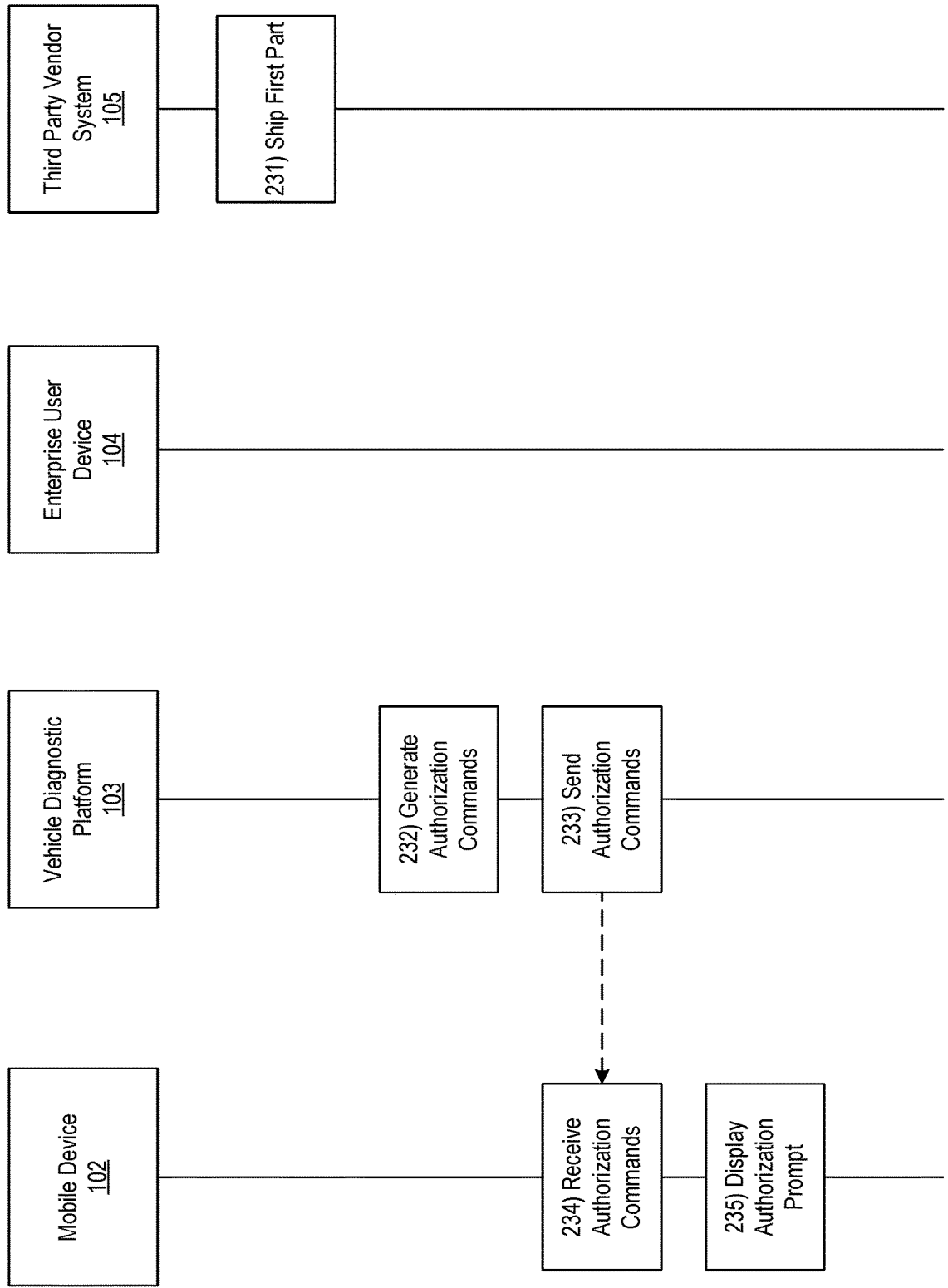

Referring to FIG. 2G, at step 231, the third party vendor system 105 may process the order for the vehicle components (e.g., the order for which commands were generated at step 228). In some instances, the third party vendor system 105 may process the order for the vehicle components in response to the one or more commands directing the third party vendor system 105 to initiate the order of vehicle components received at step 230. For example, in processing the order for the vehicle components, the third party vendor system 105 may take inventory of the vehicle components and cause shipment/otherwise make the vehicle components available for repair of the vehicle (e.g., ship them to an entity corresponding to the vehicle diagnostic platform 103, enterprise user device 104, or the like). To continue with the example described above, the third party vendor system 105 may process an order for a new battery for the 2013 Volvo XC90.

At step 232, with regard to vehicle components with likelihood of replacement scores that the vehicle diagnostic platform 103 identified as less than a predetermined replacement threshold, the vehicle diagnostic platform 103 may generate one or more commands directing the mobile device 102 to display an authorization prompt that requests authorization from a user of the mobile device 102 to initiate an order of these remaining vehicle components. In some instances, the vehicle diagnostic platform 103 may generate a message requesting the authorization to initiate the order of the remaining vehicle components. In other instances, the vehicle diagnostic platform 103 may generate information that may be used by the mobile device 102 to generate a user interface. In yet other instances, the vehicle diagnostic platform 103 may generate a user interface itself (e.g., an order authorization interface).

At step 233, the vehicle diagnostic platform 103 may send the one or more commands directing the mobile device 102 to display the authorization prompt that requests authorization from a user of the mobile device 102 to initiate the order of the remaining vehicle components. In some instances, the vehicle diagnostic platform 103 may send the one or more commands directing the mobile device 102 to display the authorization prompt that requests authorization from a user of the mobile device 102 to initiate the order of the remaining vehicle components via the communication interface 113 and while the first wireless data connection is established. In some instances, the vehicle diagnostic platform 103 may send a message, a user interface, information that may be used to generate a user interface, or the like.

At step 234, the mobile device 102 may receive the one or more commands directing the mobile device 102 to display the authorization prompt that requests authorization from a user of the mobile device 102 to initiate the order of the remaining vehicle components sent at step 233. In some instances, the mobile device 102 may receive the one or more commands directing the mobile device 102 to display the authorization prompt that requests authorization from a user of the mobile device 102 to initiate the order of the remaining vehicle components while the first wireless data connection is established.

At step 235, the mobile device 102 may display the authorization prompt. In some instances, the mobile device 102 may display the authorization prompt in response to the one or more commands directing the mobile device 102 to display the authorization prompt that requests authorization from a user of the mobile device 102 to initiate the order of the remaining vehicle components. For example, the mobile device 102 may display a user interface that prompts for user input authorizing order of the remaining vehicle components. To continue with the illustrative example described herein, at step 235, the mobile device 105 may prompt for user input authorizing the order of the engine and the radiator (e.g., because their corresponding likelihood of replacement scores did not exceed the predetermined replacement threshold). In some instances, the mobile device 102 may display the authorization prompt in a claim processing application, virtual assist application, or the like.

Figure 2H:
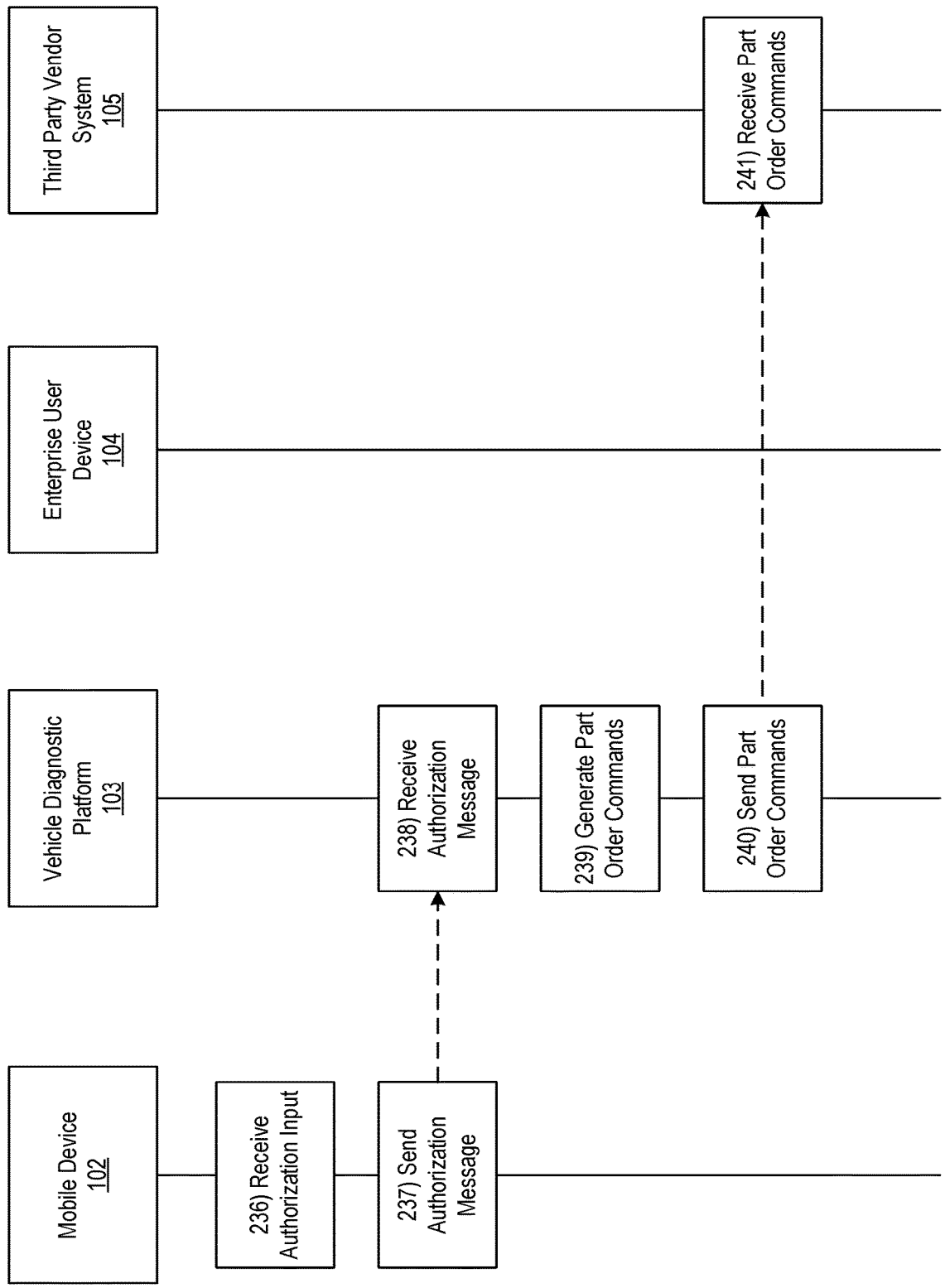

Referring to FIG. 2H, at step 236, the mobile device 102 may receive an authorization input, indicating that authorization to order the remaining vehicle components has been granted. In some instances, the mobile device 102 may receive an input indicating that authorization to order one or more of the remaining vehicle components has not been granted. In receiving the authorization input, the mobile device 102 may receive a user input corresponding to a gesture input, touch input, swipe input, text input, or the like.

At step 237, the mobile device 102 may generate and send an authorization message based on the authorization input. For example, the mobile device 102 may send a message to the vehicle diagnostic platform 103 indicating whether authorization has been granted to order the remaining vehicle components. In some instances, the mobile device 102 may send the authorization message to the vehicle diagnostic platform 103 while the first wireless data connection is established.

At step 238, the vehicle diagnostic platform 103 may receive the authorization message sent at step 237. In some instances, the vehicle diagnostic platform 103 may receive a message indicating that authorization has been granted to order one or more of the remaining components. In these instances, the vehicle diagnostic platform 103 may proceed to step 239. In some instances, the vehicle diagnostic platform 103 may receive a message indicating that authorization has not been granted for the remaining components. In these instances, the event sequence may end. In one or more instances, the vehicle diagnostic platform 103 may receive the authorization message via the communication interface 113 and while the first wireless data connection is established.

At step 239, the vehicle diagnostic platform 103 may generate one or more commands directing the third party vendor system 105 to initiate the order of vehicle components for which authorization was granted. In some instances, actions performed at step 239 may be similar to those described above at step 228.

At step 240, the vehicle diagnostic platform 103 may send the one or more commands directing the third party vendor system 105 to initiate the order of vehicle components generated at step 239. In one or more instances, the vehicle diagnostic platform 103 may send the one or more commands directing the third party vendor system 105 to initiate the order of vehicle components to the third party vendor system 105 via the communication interface 113 and while the third wireless data connection is established. In some instances, actions performed at step 240 may be similar to those described above at step 229.

At step 241, the third party vendor system 105 may receive the one or more commands directing the third party vendor system 105 to initiate the order of vehicle components sent at step 240. In one or more instances, the vehicle diagnostic platform 103 may receive the one or more commands directing the third party vendor system 105 to initiate the order of vehicle components while the third wireless data connection is established. In some instances, actions performed at step 241 may be similar to those described above with regard to step 230.

Figure 2I:
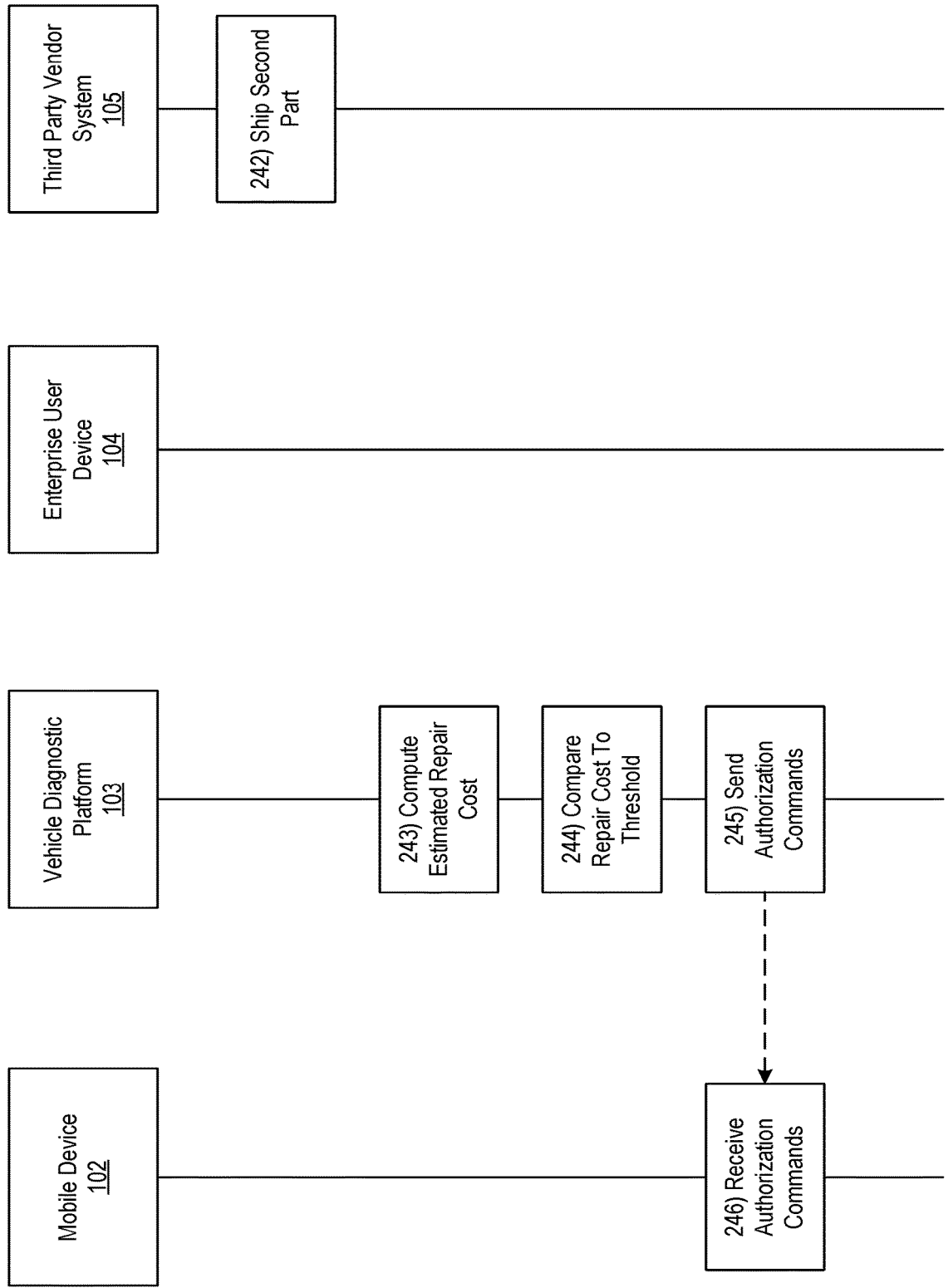

Referring to FIG. 2I, at step 242, the third party vendor system 105 may process the order for the vehicle components (e.g., the order for which commands were generated at step 239). In some instances, the third party vendor system 105 may process the order for the vehicle components in response to the one or more commands directing the third party vendor system 105 to initiate the order of vehicle components received at step 241. For example, in processing the order for the vehicle components, the third party vendor system 105 may take inventory of the vehicle components and cause shipment/otherwise make the vehicle components available for repair of the vehicle (e.g., ship them to an entity corresponding to the vehicle diagnostic platform 103, enterprise user device 104, or the like). To continue with the example described above, the third party vendor system 105 may process an order for an engine and radiator for the 2013 Volvo XC90.

At step 243, the vehicle diagnostic platform 103 may compute an estimated repair cost for the vehicle. In some instances, in computing the estimated repair cost for the vehicle, the vehicle diagnostic platform 103 may access one or more machine learning datasets and execute one or more machine learning algorithms to compute an estimated repair cost using historical data. In some instances, the vehicle diagnostic platform 103 may identify a machine learning dataset based on the damage identified at step 219. For example, the vehicle diagnostic platform 103 may identify a dataset including repair cost data corresponding to damage (e.g., as identified in step 219) to vehicles of the same type as the identified vehicle (e.g., as identified in step 213). For example, the vehicle diagnostic platform 103 may identify a dataset including repair cost data for a 2013 Volvo XC90 that experienced damage to the front of the vehicle. After identifying the one or more machine learning datasets, the vehicle diagnostic platform 103 may access these one or more machine learning datasets to compute an estimated repair cost (e.g., based on corresponding historical circumstances). For example, the vehicle diagnostic platform 103 may compute an average repair cost for vehicles of the same type with the same damage. In some instances, the vehicle diagnostic platform 103 may modify the estimated repair cost, identified using the machine learning datasets, based on identification of vehicle components to be replaced. For example, the vehicle diagnostic platform 103 may identify, using the machine learning datasets, that 2013 Volvo XC90s that experience damage to the front of the vehicle do not usually need a replacement battery. In this instance, however, the vehicle diagnostic platform 103 may have identified that the battery has a likelihood of replacement score of 0.9, thus indicating that the repair cost may be higher than indicated by historical data. In these instances, the vehicle diagnostic platform 103 may increase the estimated repair cost by the cost of the battery. In some instances, these machine learning datasets may be maintained at the vehicle diagnostic platform 103. Additionally or alternatively, the vehicle diagnostic platform 103 may access these machine learning datasets by communicating with third party databases affiliated with a manufacturer, repair service, or the like.

At step 244, the vehicle diagnostic platform 103 may compare the estimated repair cost to a predetermined repair cost threshold. In some instances, the predetermined repair cost threshold may be specified by user input (e.g., from the mobile device 102, enterprise user device 104, or the like) and/or automatically determined based on preset percentages (e.g., 30% of repairs exceed the predetermined repair cost threshold, or the like). In some instances, the vehicle diagnostic platform 103 may dynamically tune the predetermined repair cost threshold. For example, if the vehicle diagnostic platform 103 determines that 40% of repairs over a predetermined period of time have exceeded the predetermined repair cost threshold, the vehicle diagnostic platform 103 may increase the predetermined repair cost threshold so as to maintain the preset percentage of estimated repairs costs that exceed the predetermined repair cost threshold. If the vehicle diagnostic platform 103 determines that the estimated repair cost exceeds the predetermined repair cost threshold, the vehicle diagnostic platform 103 may proceed to step 245. If the vehicle diagnostic platform 103 determines that the estimated repair cost does not exceed the predetermined repair cost threshold, the vehicle diagnostic platform 103 may proceed to step 251.

At step 245, the vehicle diagnostic platform 103 may generate and send one or more commands directing the mobile device 102 to display the authorization prompt that requests authorization from a user of the mobile device 102 to initiate repair of the vehicle. In some instances, the vehicle diagnostic platform 103 may send the one or more commands directing the mobile device 102 to display the authorization prompt that requests authorization from a user of the mobile device 102 to initiate repair of the vehicle via the communication interface 113 and while the first wireless data connection is established. In some instances, the vehicle diagnostic platform 103 may send a message, a user interface, information that may be used to generate a user interface, or the like.

At step 246, mobile device 102 may receive the one or more commands directing the mobile device 102 to display the authorization prompt that requests authorization from a user of the mobile device 102 to initiate repair of the vehicle. In some instances, the mobile device 102 may receive the one or more commands directing the mobile device 102 to display the authorization prompt that requests authorization from a user of the mobile device 102 to initiate repair of the vehicle while the first wireless data connection is established. In some instances, the mobile device 102 may receive a message, a user interface, information that may be used to generate a user interface, or the like.

Figure 2J:
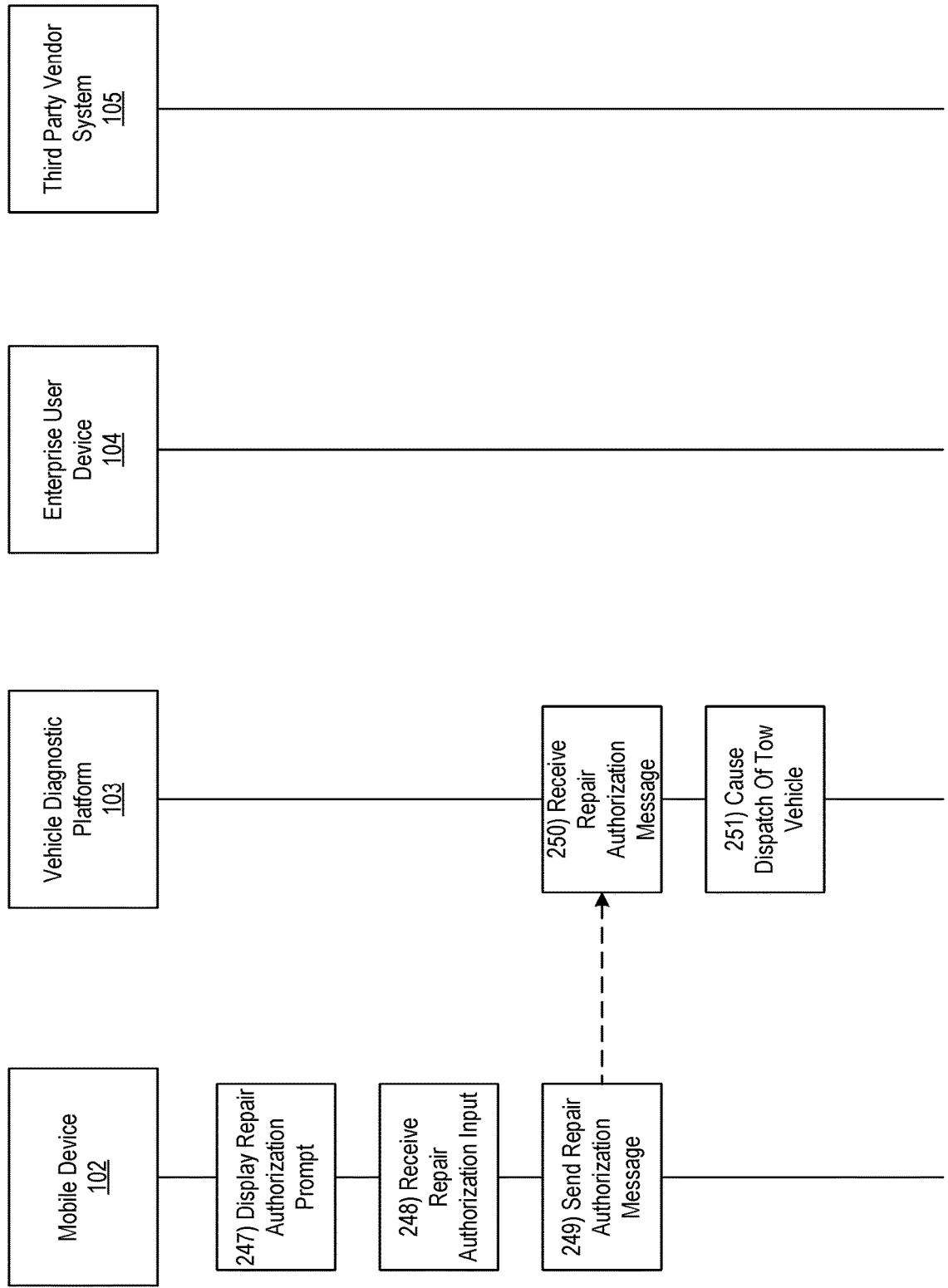

Referring to FIG. 2J, at step 247, the mobile device 102 may display the authorization prompt. In some instances, the mobile device 102 may display the authorization prompt in response to the one or more commands directing the mobile device 102 to display the authorization prompt that requests authorization from a user of the mobile device 102 to initiate repair of the vehicle. For example, the mobile device 102 may display a user interface that prompts for user input authorizing order of the repair. To continue with the illustrative example described herein, at step 247, the mobile device 105 may prompt for user input authorizing the repair of the front of the 2013 Volvo XC90. In some instances, the mobile device 102 may display the authorization prompt in a claim processing application, virtual assist application, or the like.

At step 248, the mobile device 102 may receive a repair authorization input. In some instances, the mobile device 102 may receive a user input indicating that authorization to repair the vehicle has been granted. In some instances, the mobile device 102 may receive an input indicating that authorization to repair the vehicle has not been granted. In receiving the authorization input, the mobile device 102 may receive a user input corresponding to a gesture input, touch input, swipe input, text input, or the like.

At step 249, the mobile device 102 may generate and send an authorization message based on the authorization input. For example, the mobile device 102 may send a message to the vehicle diagnostic platform 103 indicating whether authorization has been granted to repair the vehicle. In some instances, the mobile device 102 may send the authorization message to the vehicle diagnostic platform 103 while the first wireless data connection is established.

At step 250, the vehicle diagnostic platform 103 may receive the authorization message sent at step 249. In some instances, the vehicle diagnostic platform 103 may receive a message indicating that authorization has been granted to repair the vehicle. In these instances, the vehicle diagnostic platform 103 may proceed to step 251. In some instances, the vehicle diagnostic platform 103 may receive a message indicating that authorization has not been granted to repair the vehicle. In these instances, the event sequence may end. In one or more instances, the vehicle diagnostic platform 103 may receive the authorization message via the communication interface 113 and while the first wireless data connection is established.

At step 251, the vehicle diagnostic platform 103 may cause dispatch of a tow vehicle to a location of the mobile device 102 and/or the vehicle. In some instances, the vehicle diagnostic platform 103 may generate and send one or more commands to a dispatch system, which may cause display of a user interface indicating that a tow vehicle should be dispatched to the location. In some instances, the vehicle diagnostic platform 103 may generate and send one or more commands to an autonomous vehicle control system corresponding to the tow vehicle, and the one or more commands may cause the tow vehicle to autonomously initiate travel and navigate autonomously to the location of the vehicle. In some instances, the vehicle diagnostic platform 103 may dispatch the tow vehicle without further authorization from the mobile device 102.

Accordingly, one or more aspects of the systems and methods described herein may be used to address technical difficulties associated with remote diagnosis of vehicle damage. By incorporating machine learning, augmented reality, and image recognition techniques, remote diagnosis may be enhanced, allowing an individual at a remote location to view components of a vehicle that are located below a surface level of the vehicle. In doing so, one or more of the systems and methods described herein may conserve network bandwidth by reducing back and forth communication between the remote individual (e.g., an employee of a repair shop, insurance company, or the like) and the driver. Similarly, by reducing back and forth communication, response time may be improved. Furthermore, the one or more systems and methods described herein may conserve processing resources by computing scores, comparing the scores to various thresholds, and proceeding with processing only if the scores exceed the thresholds (or if authorization is otherwise provided). As yet an additional technical benefit, by linking schematic data to the damage and identifying vehicle components that likely need to be replaced, one or more of the systems and methods described herein my increase accuracy of repair cost evaluations. Furthermore, by enhancing vehicle images (e.g., showing sub-surface views, highlighting components, or the like), one or more of the systems and methods described herein may improve a user experience for the remote individual, and may facilitate improved vehicle diagnosis. It should be understood that the steps described in the illustrative event sequence may be performed in any order without departing from the scope of the disclosure.

Figure 3:
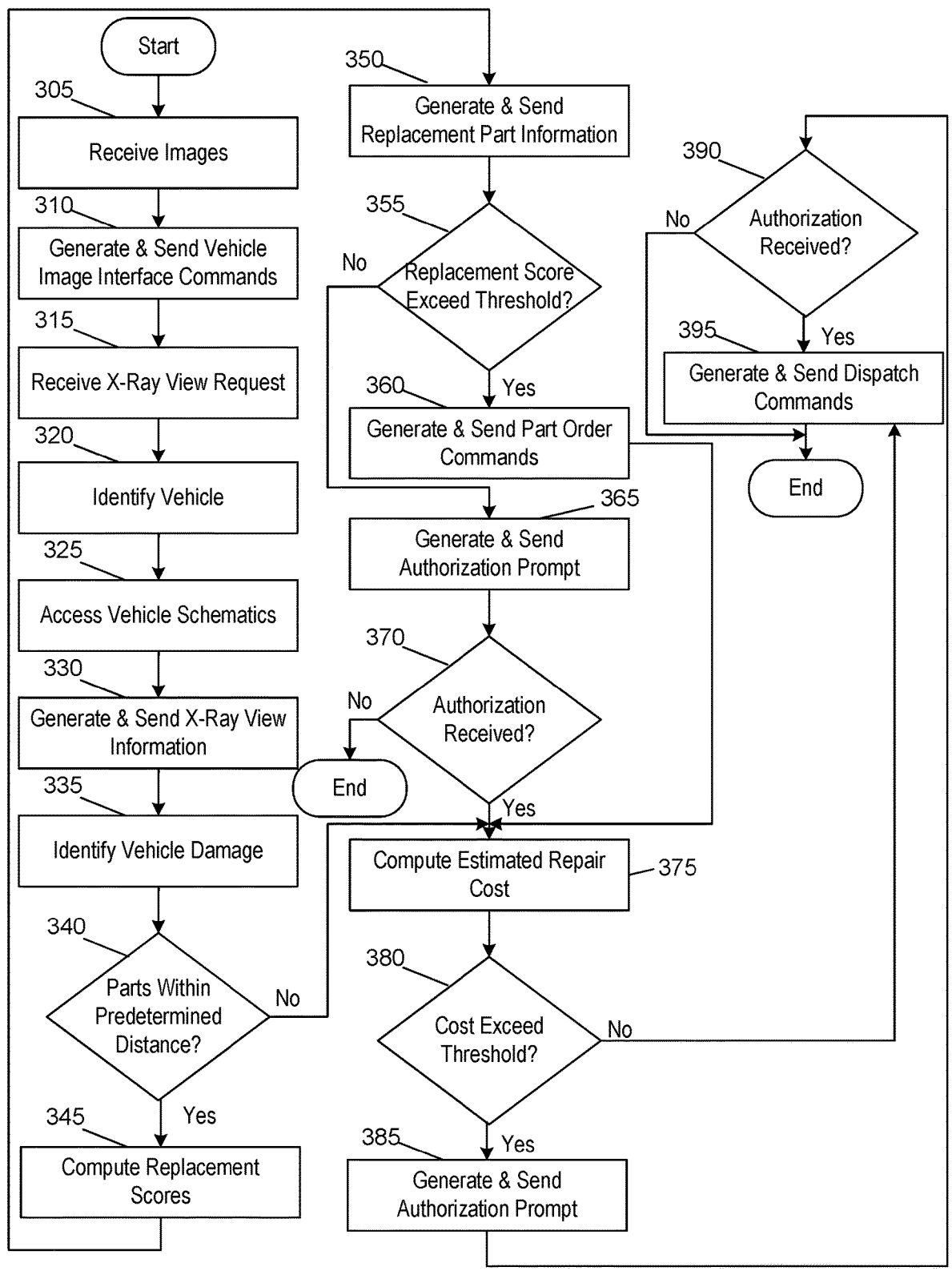
FIG. 3 depicts an illustrative method for applying improved augmented reality, image recognition, and machine learning techniques to perform improved vehicle diagnostics in accordance with one or more example arrangements discussed herein.

FIG. 3 depicts an illustrative method that applies improved augmented reality, image recognition, and machine learning techniques to perform improved vehicle diagnostics in accordance with one or more example embodiments. Referring to FIG. 3, at step 305, a computing platform having at least one processor, a communication interface, and memory may receive one or more images of a damaged vehicle. At step 310, the computing platform may generate and send one or more commands directing an enterprise user device to display a vehicle image interface. At step 315, the computing platform may receive an x-ray view request from the enterprise user device. At step 320, the computing platform may identify the vehicle in the one or more images. At step 325, the computing platform may access vehicle schematics for the identified vehicle. At step 330, the computing platform may use identified vehicle schematics to generate and send x-ray view information for the identified vehicle to the enterprise user device. At step 335, the computing platform may identify damage to the identified vehicle. At step 340, the computing platform may identify whether vehicle components are within a predetermined distance of the damage. If vehicle components are not within a predetermined distance of the damage, the computing platform may proceed to step 375. If vehicle components are within a predetermined distance of the damage, the computing platform may proceed to step 345.

At step 345, the computing platform may compute likelihood of replacement scores for each of the vehicle components that are within the predetermined distance of the damage. At step 350, the computing platform may generate and send replacement part information based on the vehicle components that are within the predetermined distance of the damage. At step 355, the computing platform may compare the likelihood of replacement scores to a predetermined replacement threshold. For likelihood of replacement scores that exceed the predetermined replacement threshold, the computing platform may proceed to step 360. For likelihood of replacement scores that do not exceed the predetermined replacement threshold, the computing platform may proceed to step 365.

At step 360, the computing platform may generate and send one or more commands directing a third party vendor system to process an order for vehicle components with corresponding likelihood of replacement scores that exceed the predetermined replacement threshold. At step 365, the computing platform may generate and send an authorization prompt to the user device prompting for authorization to process an order for the vehicle components with corresponding likelihood of replacement scores that do not exceed the predetermined replacement threshold. At step 370, the computing platform may determine whether authorization was received from the user device. If authorization was not received from the user device, the method may end. If authorization was received from the user device, the computing platform may proceed to step 375.

At step 375, the computing platform may compute an estimated repair cost for the identified vehicle. At step 380, the computing platform may determine whether the estimated repair cost exceeds a predetermined repair cost threshold. If the estimated repair cost does exceed the predetermined repair cost threshold, the computing platform may proceed to step 385. If the estimated repair cost does not exceed the predetermined repair cost threshold, the computing platform may proceed to step 395.

At step 385, the computing platform may generate and send an authorization prompt to the user device, prompting for authorization to proceed with repair of the identified vehicle. At step 390, the computing platform may determine whether authorization was received. If authorization was not received, the method may end. If authorization was received, the computing platform may proceed to step 395. At step 395, the computing platform may generate and send one or more commands directing dispatch of a tow vehicle to a location of the identified vehicle.

It should be understood that while the systems and methods described herein in the illustrative event sequence, system diagrams, and methods, are primarily described in the context of vehicle damage and repair, the systems and methods described herein may be applied to any number of other fields and applications to assist with evaluation of device performance, or the like, without departing from the scope of the disclosure. For example, one or more of the systems and methods described herein may apply to damage in a home or other building. For example, images may be shared with a diagnostic platform through a virtual inspection application on the mobile device 102. In this example, the diagnostic platform may be configured to leverage machine learning, augmented reality, and/or image recognition techniques in similar methods as described above. For example, the diagnostic platform may identify water damage to a wall, determine materials that would be used for the repair, and determine an estimated repair cost. In some instances, the diagnostic platform may be configured to identify relevant contractors and communicate them to the mobile device 102. In some instances, schematics from homes, buildings, developments, or the like may be used to identify plumbing, electrical components, or the like, that is ordinarily concealed by walls.

Accordingly, the outlined systems and methods may be applied to a wide variety of use cases beyond vehicle damage diagnosis and may be applied by any user/individual (e.g., not merely an insurance representative, manager, customer, or the like). It should also be understood that although the systems and methods described herein primarily refer to the use of images, analysis of videos and/or real-time analysis may be performed using a live video feed may be performed using the techniques described above.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        receive one or more images that depict one or more visible sections of a vehicle;
        identify, by applying one or more image recognition and machine learning algorithms to the one or more images that depict the one or more visible sections of the vehicle, the vehicle;
        identify one or more schematics corresponding to the identified vehicle;
        generate, based on a graphical overlay of the one or more images that depict the one or more visible sections of the vehicle and using the one or more schematics, x-ray image information corresponding to the identified vehicle; and
        send, to an enterprise user device, the one or more images, the x-ray image information corresponding to the identified vehicle, and one or more commands directing the enterprise user device to display an x-ray image of the vehicle, wherein sending the one or more commands directing the enterprise user device to display the x-ray image of the vehicle causes the enterprise user device to:
            modify the one or more images of the vehicle based on the x-ray image information,
            display an x-ray vehicle interface, wherein the x-ray vehicle interface depicts a graphic representation of a subsurface portion of the vehicle having one or more components that are not visible in the one or more images of the vehicle, and
            identify one or more potentially damaged vehicle components.

2. The computing platform of claim 1, wherein identifying the vehicle comprises:
    comparing image data of the one or more images of the vehicle to a machine learning dataset that includes additional image data for a plurality of additional images of a plurality of vehicles;
    identifying, based on the comparison, a match between the image data and a subset of the additional image data;
    accessing vehicle identification information corresponding to the subset of the additional image data, wherein the vehicle identification information comprises one or more of: a vehicle make, a vehicle model, a vehicle year, or a vehicle condition; and
    identifying, using the vehicle identification information, an identity of the vehicle.

3. The computing platform of claim 2, wherein the memory stores additional computer-readable instructions that, when executed by the at least one processor, cause the computing platform to:
    determine, using one or more image recognition and machine learning algorithms, damage to the identified vehicle, wherein determining the damage to the identified vehicle comprises:
        comparing the image data of the one or more images of the identified vehicle to the subset of the additional image data;
        identifying, based on the comparison, a match between the image data and a second subset of the additional image data;
        accessing damage information corresponding to the second subset of the additional image data, wherein the damage information includes details corresponding to damage of vehicles corresponding to the second subset of the additional image data; and
        identifying, using the damage information, the damage to the identified vehicle, wherein identifying the damage to the identified vehicle includes at least identifying a location of the damage to the identified vehicle.

4. The computing platform of claim 3, wherein the memory stores additional computer-readable instructions that, when executed by the at least one processor, cause the computing platform to:
    identify, using the one or more schematics and the location of the damage to the identified vehicle, one or more vehicle components that are within a predetermined distance of the identified damage; and
    compute, for each of the one or more vehicle components that are within the predetermined distance of the identified damage and using one or more additional machine learning algorithms, a likelihood of replacement score.

5. The computing platform of claim 4, wherein computing the likelihood of replacement score comprises:
    accessing a stored database that include correlations between the second subset of the additional image data and, for each vehicle corresponding to the second subset of the additional image data, an indication of vehicle components that were replaced in repairing the corresponding vehicle;
    computing, using the indications of vehicle components that were replaced in repairing the corresponding vehicles and for each of the one or more vehicle components that are within the predetermined distance of the identified damage, a likelihood of replacement score for each vehicle component identified in the stored database; and
    comparing the likelihood of replacement score for each vehicle component identified in the stored database to a predetermined replacement threshold.

6. The computing platform of claim 5, wherein the memory stores additional computer-readable instructions that, when executed by the at least one processor, cause the computing platform to:

in response to determining that the likelihood of replacement score for a first vehicle component of the one or more vehicle components that are within the predetermined distance of the identified damage exceeds the predetermined replacement threshold, generate one or more commands directing a third party vendor system to provide a replacement for the first vehicle component; and send, to the third party vendor system, the one or more commands directing the third party vendor system to provide the replacement for the first vehicle component, wherein sending the one or more commands directing the third party vendor system to provide the replacement for the first vehicle component causes the third party vendor system to cause shipment of the replacement for the first vehicle component to an enterprise organization corresponding to the enterprise user device.

7. The computing platform of claim 6, wherein the memory stores additional computer-readable instructions that, when executed by the at least one processor, cause the computing platform to:

in response to determining that the likelihood of replacement score for a second vehicle component of the one or more vehicle components that are within the predetermined distance of the identified damage does not exceed the predetermined replacement threshold, send one or more commands, to a mobile device, directing the mobile device to display a prompt for client authorization;

receive a message, from the mobile device, providing authorization to order a replacement for the second vehicle component; and send, to the third party vendor system, one or more commands directing the third party vendor system to provide the replacement for the second vehicle component, wherein sending the one or more commands directing the third party vendor system to provide the replacement for the second vehicle component causes the third party vendor system to cause shipment of the replacement for the second vehicle component to the enterprise organization corresponding to the enterprise user device.

8. The computing platform of claim 4, wherein the memory stores additional computer-readable instructions that, when executed by the at least one processor, cause the computing platform to:

generate, based on the likelihood of replacement scores for each of the one or more vehicle components, replacement part information;

generate one or more commands directing the enterprise user device to display a highlighted x-ray interface; and send, to the enterprise user device, the one or more commands directing the enterprise user device to display the highlighted x-ray interface, wherein sending the one or more commands directing the enterprise user device to display the highlighted x-ray interface causes the enterprise user device to:

generate, using the replacement part information, a highlight overlay for the x-ray vehicle interface that emphasizes, using a particular color, the one or more vehicle components that are within the predetermined distance of the identified damage; and display, along with the x-ray vehicle interface, the highlight overlay.

9. The computing platform of claim 4, wherein the memory stores additional computer-readable instructions that, when executed by the at least one processor, cause the computing platform to:

access the stored database, wherein the stored database further includes correlations between the second subset of the additional image data and repair costs for each vehicle corresponding to the second subset of the additional image data;

compute, by averaging the repair costs for each vehicle corresponding to the second subset of the additional image data, a predicted repair cost for the identified vehicle; and compare the predicted repair cost to a predetermined repair cost threshold.

10. The computing platform of claim 9, wherein the memory stores additional computer-readable instructions that, when executed by the at least one processor, cause the computing platform to:

in response to determining that the predicted repair cost does not exceed the predetermined repair cost threshold, cause dispatch of a tow vehicle to a location of the identified vehicle, wherein the tow vehicle is dispatched to the location of the identified vehicle without further authorization provided from a mobile device.

11. The computing platform of claim 10, wherein causing dispatch of the tow vehicle comprises:

generating one or more commands directing an autonomous vehicle control system corresponding to the tow vehicle to cause the tow vehicle to drive in an autonomous manner to the location of the identified vehicle; and sending, to the autonomous vehicle control system, the one or more commands directing the autonomous vehicle control system corresponding to the tow vehicle to cause the tow vehicle to drive in an autonomous manner to the location of the identified vehicle, wherein sending the one or more commands directing the autonomous vehicle control system corresponding to the tow vehicle to cause the tow vehicle to drive in an autonomous manner to the location of the identified vehicle causes the tow vehicle to drive in an autonomous manner to the location of the identified vehicle.

12. The computing platform of claim 9, wherein the memory stores additional computer-readable instructions that, when executed by the at least one processor, cause the computing platform to:

in response to determining that the predicted repair cost exceeds the predetermined repair cost threshold, send one or more commands, to a mobile device, directing the mobile device to display a prompt for client authorization;

receive a message, from the mobile device, providing authorization to initiate repair of the identified vehicle; and cause dispatch of a tow vehicle to a location of the identified vehicle.

13. The computing platform of claim 1, wherein identifying the one or more schematics corresponding to the identified vehicle comprises:

accessing a stored dataset of correlations between vehicle identification information and schematics; and identifying, using the vehicle identification information, the one or more schematics corresponding to the identified vehicle, wherein each of the one or more schematics is associated with a portion of the identified vehicle.

14. The computing platform of claim 1, wherein generating the x-ray image information further comprises generating information that may be used to generate the graphical overlay on the one or more images, wherein the graphical overlay comprises one of the one or more schematics overlaid on a portion of the identified vehicle to which the one of the one or more schematics corresponds.

15. A method comprising:
at a computing platform comprising at least one processor, a communication interface, and memory:
receiving one or more images that depict one or more visible sections of a vehicle;
identifying, by applying one or more image recognition and machine learning algorithms to the one or more images that depict the one or more visible sections of the vehicle, the vehicle;
identifying one or more schematics corresponding to the identified vehicle;
generating, based on a graphical overlay of the one or more images that depict the one or more visible sections of the vehicle and using the one or more schematics, x-ray image information corresponding to the identified vehicle, wherein the x-ray image information depicts a subsurface portion of the identified vehicle not visible in the one or more images of the vehicle; and
sending, to an enterprise user device, the one or more images, the x-ray image information corresponding to the identified vehicle, and one or more commands directing the enterprise user device to display an x-ray image of the vehicle, wherein sending the one or more commands directing the enterprise user device to display the x-ray image of the vehicle causes the enterprise user device to:
generate, using the x-ray image information corresponding to the identified vehicle, a graphical overlay depicting one of the one or more schematics overlaid on a portion of the identified vehicle to which the one of the one or more schematics corresponds;
identify one or more potentially damaged vehicle components; and
display, along with the one or more images of the vehicle, the graphical overlay.

16. The method of claim 15, wherein identifying the vehicle comprises:
comparing image data of the one or more images of the vehicle to a machine learning dataset that includes additional image data for a plurality of additional images of a plurality of vehicles;
identifying, based on the comparison, a match between the image data and a subset of the additional image data;
accessing vehicle identification information corresponding to the subset of the additional image data, wherein the vehicle identification information comprises one or more of: a vehicle make, a vehicle model, a vehicle year, or a vehicle condition; and
identifying, using the vehicle identification information, an identity of the vehicle.

17. The method of claim 16, wherein identifying the one or more schematics corresponding to the identified vehicle comprises:
accessing a stored dataset of correlations between vehicle identification information and schematics; and
identifying, using the vehicle identification information, the one or more schematics corresponding to the identified vehicle, wherein each of the one or more schematics is associated with a portion of the identified vehicle.

18. The method of claim 17, further comprising:
determining, one or more image recognition and machine learning algorithms, damage to the identified vehicle, wherein determining the damage to the identified vehicle comprises:
comparing the image data of the one or more images of the identified vehicle to the subset of the additional image data;
identifying, based on the comparison, a match between the image data and a second subset of the additional image data;
accessing damage information corresponding to the second subset of the additional image data, wherein the damage information includes details corresponding to damage of vehicles corresponding to the second subset of the additional image data; and
identifying, using the damage information, damage to the identified vehicle, the damage to the identified vehicle, wherein identifying the damage to the identified vehicle includes at least identifying a location of the damage to the identified vehicle.

19. The method of claim 18, further comprising:
identifying, using the one or more schematics and the location of the damage to the identified vehicle, one or more vehicle components that are within a predetermined distance of the identified damage; and
computing, for each of the one or more vehicle components that are within the predetermined distance of the identified damage and using one or more additional machine learning algorithms, a likelihood of replacement score.

20. One or more non-transitory computer-readable media storing instructions that, when executed by a computing platform comprising at least one processor, a communication interface, and memory, cause the computing platform to:
receive, from a client device, a live video stream that depicts one or more visible sections of a vehicle;
identify, by applying one or more image recognition and machine learning algorithms to the live video stream that depicts the one or more visible sections of the vehicle, the vehicle;
identify one or more schematics corresponding to the identified vehicle;
generate, based on a graphical overlay of one or more images comprised within the live video stream and that depict the one or more visible sections of the vehicle and using the one or more schematics, x-ray image information corresponding to the identified vehicle; and
send, to the client device, the x-ray image information corresponding to the identified vehicle and one or more commands directing the client device to display an x-ray video stream of the vehicle, wherein sending the one or more commands directing the client device to display the x-ray video stream of the vehicle causes the client device to:
modify the live video stream of the vehicle based on the x-ray image information, display an x-ray live video stream of the vehicle, wherein the x-ray live video stream is displayed in real time on the client device and wherein the x-ray live video stream of the vehicle depicts a graphical representation of a subsurface portion of the vehicle having one or more components that are not visible in the live video stream of the vehicle, and identify one or more potentially damaged vehicle components.

\* \* \* \* \*